United States Patent [19]
Sakazaki et al.

[11] Patent Number: 5,889,918
[45] Date of Patent: Mar. 30, 1999

[54] METHOD AND APPARATUS FOR RECORDING DIGITAL PICTURE IMAGE SIGNALS FOR MULTIPLE SPEED REPRODUCTION

[75] Inventors: Yoshihisa Sakazaki; Kenji Shimoda, both of Kanagawa-ken; Akira Nagashima; Tetsuo Nagoya, both of Saitama-ken, all of Japan

[73] Assignee: Kabushiki Kaisha Toshiba, Kawasaki, Japan

[21] Appl. No.: 413,727

[22] Filed: Mar. 31, 1995

[30] Foreign Application Priority Data

Apr. 1, 1994 [JP] Japan ................................. 6-065298

[51] Int. Cl.⁶ .................................................. H04N 5/783
[52] U.S. Cl. ............................................. 386/68; 386/112
[58] Field of Search .................................. 386/46, 68, 81, 386/80, 111, 95, 96, 98, 112, 109; H04N 5/76, 5/783

[56] References Cited

U.S. PATENT DOCUMENTS

| | | | |
|---|---|---|---|
| 5,089,919 | 2/1992 | Kozuki et al. | 360/27 |
| 5,136,391 | 8/1992 | Minami | 358/312 |
| 5,341,178 | 8/1994 | Ebihara et al. | 358/335 |
| 5,434,677 | 7/1995 | Oikawa | 386/124 |
| 5,450,209 | 9/1995 | Niimura et al. | 358/335 |
| 5,461,486 | 10/1995 | Uchida | 358/335 |

FOREIGN PATENT DOCUMENTS 0 367 264  6/1989  European Pat. Off. .
0 353 758  2/1990  European Pat. Off. .

OTHER PUBLICATIONS

Technical Report of IEICE MR93–28, Oct. 1993, pp. 21–26, "A Study of High Speed Search Technique for Digital VCR with High Bit Rate Reduction System", A. Takeuchi et al.

Scalable Speed Search Technique for Digital VCRs, Kobayashi et al, Matsushita Electric Industrial Co., Ltd. Osaka, Japan.

Azadegan et al., "Data Placement Procedure for Multi-Speed Digital VCR", IEEE Transactions on Consumer Electronics, No. 3, Aug. 1994.

Primary Examiner—Thai Tran
Assistant Examiner—Huy Nguyen
Attorney, Agent, or Firm—Pillsbury Madison & Sutro LLP

[57] ABSTRACT

A digital picture image signal recording method, in which by sequentially forming tracks on a tape recording medium running at a prescribed speed oblique to its running direction digital picture image signals compressed by a high efficiency encoding technique are recorded using rotary heads and at the same time, and then plural kinds of tracking pilot signals with different frequencies on adjacent tracks are recorded, the method comprises the steps of deriving data which are essential to decoding the recorded digital picture image signals from the high efficiency encoded digital signals, successively establishing record areas in unit of a number of tracks equivalent to a cycle period of the tracking pilot signals that can be distinguished by the pilot signal as one group, and recording data which are essential to the decoding in the recording areas.

6 Claims, 25 Drawing Sheets

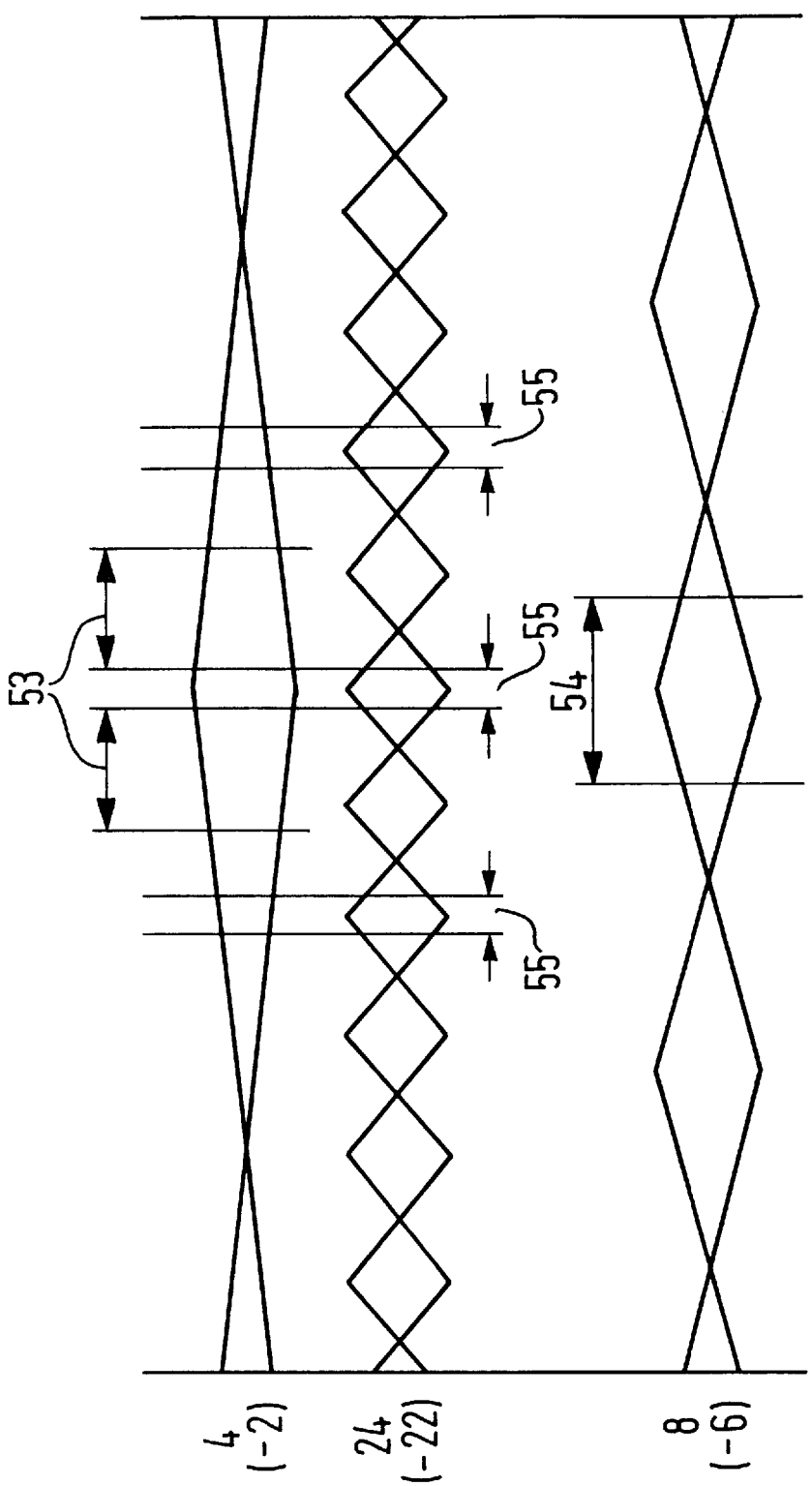

FIG. 3
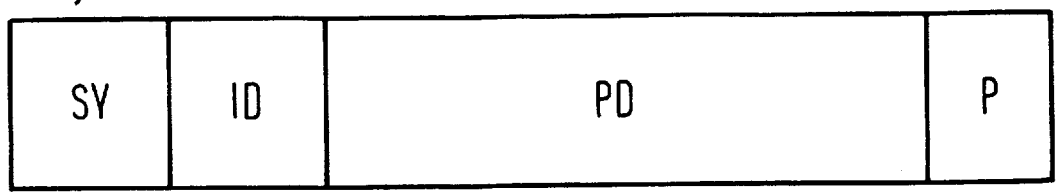
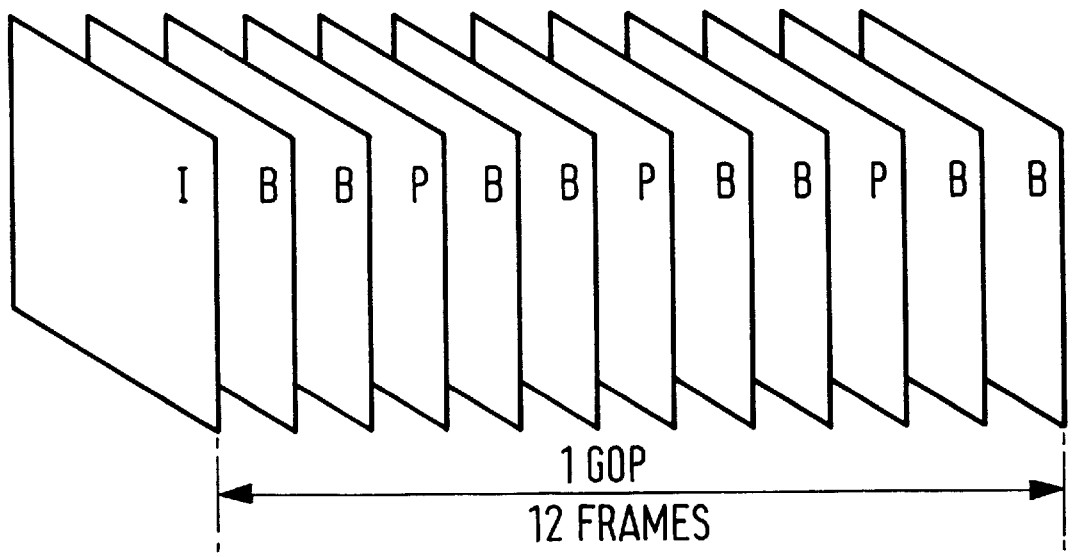
FIG. 4
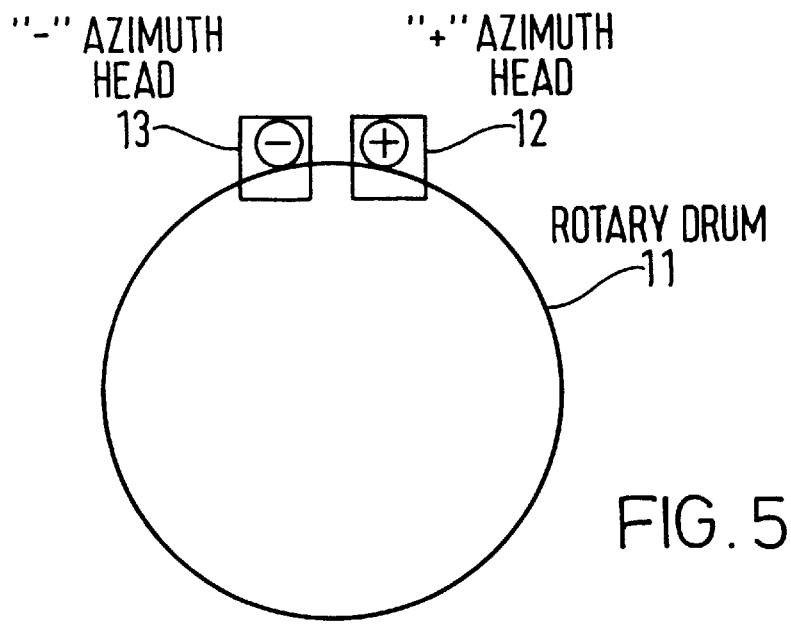
FIG. 5

TABLE 1

| PICTURE IMAGE DISPLAY PERIOD IN PARTICULAR SPEED REPRODUCTION (n×1/30) | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| REPRODUCED I-FRAME No. AT 4-TIMES SPEED | 0 | 0 | 0 | 12 | 12 | 12 | 24 | 24 | 24 | 36 | 36 | 36 | 48 | 48 | 48 |
| REPRODUCED I-FRAME No. AT 8-TIMES SPEED | 0 | 0 | 0 | 24 | 24 | 24 | 48 | 48 | 48 | 72 | 72 | 72 | 96 | 96 | 96 |
| REPRODUCED I-FRAME No. AT 24-TIMES SPEED | 0 | 0 | 48 | 48 | 96 | 96 | 144 | 144 | 192 | 192 | 240 | 240 | 288 | 288 | 336 |

1 GOP = 12 FRAMES
1 FRAME No. = 0, 12, 24, 36, 48, 72, ...

FIG. 26

FIG. 27
TABLE 2

SYNC BLOCK IDs

| DD3 | DD2 | DD1 | DD0 | Trp3 | Trp2 | Trp1 | Trp0 |

| ID0 | | |
|---|---|---|
| DD1, | DD0 | |
| 0 | 0 | DATA FOR STANDARD SPEED REPRODUCTION |
| 0 | 1 | DATA FOR REPRODUCTION AT +4(-2) TIMES SPEED |
| 1 | 0 | DATA FOR REPRODUCTION AT +8(-6) TIMES SPEED |
| 1 | 1 | DATA FOR REPRODUCTION AT +24(-22) TIMES SPEED |

| DD2 | |
|---|---|
| | "0" STATE & "1" STATE ALTERNATE AT EACH UNIT OF REPETITION OF SAME DATA |

| DD3 | |
|---|---|
| 0 | VALID DATA |
| 1 | INVALID DATA | ers run across multiple tracks of the tape as the tape feeding speed is changed and picture image data are intermittently obtained. This creates a lack of the continuity in the data. Therefore, if such encoded data are recorded on a tape, the reproduction of data at variable speeds will become extremely difficult.

METHOD AND APPARATUS FOR RECORDING DIGITAL PICTURE IMAGE SIGNALS FOR MULTIPLE SPEED REPRODUCTION

FIELD OF THE INVENTION

The present invention relates to a method and an apparatus for recording or reproducing digital picture image signals which have been compressed by a high efficiency encoding technique.

BACKGROUND OF THE INVENTION

Digital recording of picture image data made great progress and has been put in practical use in recent years.

In the digital recording of picture image data, if images are directly digitized, too much information results and high running costs are required for recording or reproducing the signals. In order to solve this problem, a high efficiency encoding technique, such as the international MPEG (Motion Picture Expert Group) standard, is carried out.

However, when such encoded digital picture image data are recorded on a magnetic tape by a helical scanning type video tape recorder (VTR) equipped with rotary heads and the recorded data are reproduced at tape speeds differing from the recording speed, the reproducing heads run across multiple tracks of the tape as the tape feeding speed is changed and picture image data are intermittently obtained. This creates a lack of the continuity in the data. Therefore, if such encoded data are recorded on a tape, the reproduction of data at variable speeds will become extremely difficult.

In order to overcome such a defect, a proposal has been made to limit the number of reproduction speeds and arrange data on tracks that are reproducible by reproducing heads for the particular reproduction speeds.

One tape format for a conventional digital VTR is shown in FIG. 20. Data are recorded or reproduced on or from oblique tracks 2 of a magnetic tape 1 using rotary heads as shown in FIG. 21. Pilot signals F1, F0 and F2, which are required for tracking, are recorded on the tracks 2 in that particular sequence. The tracks 2 are formed so that adjacent tracks form an opposite azimuth and the pilot signals are recorded by superimposing them on picture image data and voice data. The pilot signals are recorded in repetitive cycle periods of 4 signals F0, F1, F0 and F2. Each of the tracks 2 is provided with a picture image data area and a voice data area as shown in FIG. 20. 10 tracks are used per 1/30 sec., which is equivalent to a time of one frame.

The construction of the rotary head is shown in FIG. 21. The rotary head contains a "+" azimuth head 4 and a "−" azimuth head 5. The "−" azimuth head is 180° away from the head 4 on a rotary drum 3.

The construction of one GOP (group of pictures) picture image data in the MPEG standard is shown in FIG. 22. One GOP is comprised of 12 frames. Out of these frames, the I-frame contains only intra-frame encoded data, the frame P contains the intra-frame data and inter-frame predictive encoded data from the preceding I-frame or the intra-frame and inter-frame data from the preceding P-frame, and the frame B contains either the intra-frame and the preceding I-frame or the preceding P-frame and the inter-frame data from the succeeding I-frame data or the succeeding P-frame.

FIG. 23(a) shows the relationship between the track pattern and the scanning loci of the rotary heads during reproduction at +5(−3), +9(−7) and +17(−15) times speeds. The symbol "+" indicates when a tape is run in the same direction as the recording direction while the symbol "−" indicates when a tape is run in the direction reverse to the recording direction and the numerals show the number if times the tape speed is faster than the recording speed.

For simplicity of explanation, the track pattern is shown by mapping the normally oblique tracks onto tracks which are vertical with respect to the longitudinal direction of the tape, in the drawings used for the following explanations. In FIG. 23(b), envelopes of picture image data reproduced at the speeds shown in FIG. 23(a) are illustrated. The envelopes shown in FIG. 23(b) are the envelopes reproduced by the reproducing head having the "+" azimuth at the respective speeds shown in FIG. 23(a).

As shown in FIGS. 23(a) and 23(b), picture image data can be reproduced at respective ends A and B and the center C of the track 2, which are common to all the speeds described above.

Accordingly, when data areas for the particular speed reproduction are provided on a magnetic tape, they are normally provided at respective ends A and B and the center C of the track 2 for carrying out the particular speed reproduction. In the reproduction data areas A, B and C within one track, particular speed reproduction data generated by low frequency components (DC and low frequency components) of DCT (Digital Cosine Transformation) data of a frame equivalent to the upper ¼ of the I-frame, as shown in FIG. 25, are recorded. Then, the same data are repetitively recorded over the adjacent 17 tracks. Thus, the continuity of data recorded in the reproduction data areas for particular speeds provided at the center and the respective ends of the tracks is maintained. Consequently, even when the repetitive recording causes the picture image data to be reproducible in any track, low frequency component data equivalent to the upper ¼ of the next I-frame are recorded in the reproduction data areas of the next 17 tracks, and it becomes possible to achieve the particular speed reproduction of picture image data recorded in the reproduction data areas for particular speeds by updating the I-frame by ¼ at the +5(−3), +9(7) and +17(15) time speeds.

By the way, a VTR which records or reproduces high efficiency encoded picture image data as described above for particular speed reproduction uses limited areas that are traceable by the reproducing heads at a low speed as well as a high speed. Furthermore, the same particular speed reproduction data are used at all speeds, creating deterioration in the video quality that is not conspicuous at a high speeds but is very noticeable at low speeds.

As described above, in a conventional digital VTR, there was a problem with the deterioration in video quality that is not conspicuous at high speeds but is noticeable at a low speed.

SUMMARY OF THE INVENTION

It is therefore an object of the present invention to provide a digital picture image signal recording or reproducing method and an apparatus which is capable of reducing the deterioration in video quality at low speeds in a digital VTR for recording or reproducing high efficiency encoded digital picture image signals and obtaining stabilized and high-quality particular speed reproduction picture images.

In order to achieve the above object, one aspect of the present invention is a digital picture image signal recording method, in which by sequentially forming tracks on a tape recording medium running at a prescribed speed oblique to the running direction of the recording medium, digital picture image signals compressed by a high efficiency encoding technique are recorded using rotary heads at the same time the tracks are formed, and plural kinds of pilot signals having different frequencies on adjacent tracks are recorded. The method comprises the steps of deriving data which are essential to decoding the recorded digital picture image signals from the high efficiency encoded digital signals, successively establishing record areas in units of a number of tracks equivalent to a cycle period of the pilot signals that can be distinguished through the pilot signals as one repetitive cycle, and recording data which are essential for decoding in the recording areas.

Another aspect of the present invention is a digital picture image signal recording method, in which by sequentially forming tracks on a tape recording medium running at a prescribed speed oblique to the running direction of the recording medium, digital picture image signals compressed by a high efficiency encoding technique are recorded using rotary heads at the same time the tracks are formed, and plural kinds of tracking pilot signals with different frequencies on adjacent tracks are recorded. The method comprises the steps of deriving data which are essential to decoding the recorded digital picture image signals from the high efficiency encoded digital signals, successively establishing record areas in units of the maximum number of contiguous tracks that can be distinguished through the pilot signals as one group, and recording data which are essential for the decoding in the recording areas.

A further aspect of the invention is a digital picture image signal recording or reproducing method in which by sequentially forming tracks on a tape recording medium running at a prescribed speed oblique to the running direction of the recording medium, digital picture image signals compressed by a high efficiency encoding technique are recorded using the rotary heads at the same time the tracks are formed, and plural kinds of tracking pilot signals with different frequencies on adjacent tracks are recorded. The method comprises the steps of deriving data which are essential to decoding the recorded digital picture image signals from the high efficiency encoded digital signals, successively establishing recording areas in units of a number of tracks equivalent to a cycle period of the tracking pilot signals that can be distinguished through the pilot signals as one group, recording data which are essential for decoding in the recording areas, and reproducing the digital picture image signals recorded on the tape recording medium by the rotary heads while running the recording medium at a speed of a multiple of the number of tracks equivalent to a cycle period of the pilot signals.

Yet another aspect of the invention is a digital picture image signal recording or reproducing method in which by sequentially forming tracks on a tape recording medium running at a prescribed speed oblique to the running direction of the recording medium, digital picture image signals compressed by a high efficiency encoding technique are recorded using the rotary heads at the same time the tracks are formed, and plural kinds of pilot signals with different frequencies on adjacent tracks are recorded. The method comprises the steps of deriving data which are essential for decoding the recorded digital picture image signals from the high efficiency encoded digital signals, successively establishing recording areas in units of the maximum number of contiguous tracks that can be distinguished through the pilot signals as one repetitive cycle, recording data which are essential for decoding in the recording areas, and reproducing the digital picture image signals recorded on the tape recording medium by the rotary heads while running the recording medium at a speed of a multiple of the number of tracks equivalent to one pilot signal cycle period.

A still further aspect of the present invention is a digital picture image signal recording or reproducing method wherein the reproducing speed of the tape recording medium is set at a speed as defined by an equation: $n=(k/2)\times r$, wherein n is a particular reproduction speed, k is a number of tracks equivalent to a prescribed cycle period and r is a selected number of cycle periods, essential data for decoding the decoded digital picture image signals are derived at every reproducing speed, and at each track traced by the rotary heads at each reproducing speed, essential data for decoding are repetitively recorded in units of tracks on the tracks between the tracks that are traced.

An invention as claimed in claim 6 is a digital picture image signal recording or reproducing method as claimed in claim 2, wherein the reproducing speed of the tape recording medium is set at multiple speeds comprising a submultiple or a multiple of the number of tracks equivalent to the pilot signal cycle period, essential data for decoding the recorded digital picture image signals are derived at every reproducing speed, and at each track that is traced by the rotary heads at every reproducing speed, essential data for decoding are repetitively recorded in units of tracks on the tracks between the tracks that are traced.

Still another aspect of the present invention is a digital picture image signal recording or reproducing method wherein the reproducing speed of the tape recording medium is set at multiple speeds comprising a submultiple or a multiple of the number of tracks equivalent to the pilot signal cycle period, essential data for decoding the recorded digital picture image signals are derived at every reproducing speed, and the essential data are recorded in different recording areas of the track at every reproducing speed and the recording areas are arranged such than the essential data for each reproducing speed would be arranged symmetrically with respect to the longitudinal center line of the recording medium if the oblique direction of the tracks were mapped perpendicularly to the longitudinal center line of the recording medium.

Yet a further aspect of the present invention is a digital picture image signal recording or reproducing apparatus which is capable of recording digital picture image signals compressed by a high efficiency encoding technique on a tape recording medium running at a prescribed speed by forming tracks sequentially and oblique to the traveling direction of the recording medium using rotary heads, recording plural kinds of pilot signals with different frequencies which cycle in a prescribed track cycle period on adjacent tracks, and reproducing digital picture image signals while running the tape recording medium at multiple prescribed speeds faster than the recording speed. The apparatus is provided with data generating means for generating and deriving data from the digital picture image signals that are essential for decoding the digital picture image signals at every reproducing speed, first buffer means comprising multiple buffers for temporarily storing derived data, first data rate conversion means for converting a data rate of the digital picture image signals into a prescribed faster data rate, recording system selecting means for selectively arranging the data from the first data rate conversion means and multiple data from the first buffer means time series to form and output a data train corresponding to a prescribed tape format, recording means for recording the data train from the recording system selecting means and the multiple pilot signals using the rotary heads, reproduction means for reproducing the data train and the pilot signals using the rotary heads while running the tape recording medium at a speed responsive to a control signal to control the tracking based on the pilot signals, reproduction system selecting means for selecting either output data which are essential for decoding operations from the reproduction means or standard speed reproduction data in response to a control signal indicating whether the reproduction is the particular speed reproduction, second buffer means for sequentially outputting data that are essential for decoding the data output from the reproduction system selecting means in the reproduction at a two times speed to a decoding circuit after holding them for a prescribed period, and second data rate conversion means for converting to output standard speed reproduction data that are output from the reproduction system selecting means in the standard speed reproduction to the original data rate.

Still another aspect of the present invention is a digital picture image signal recording method for recording digital picture image signals compressed by a high efficiency encoding technique on a tape recording medium running at a prescribed speed using rotary heads by sequentially forming tracks which are in mutually different azimuths to adjacent tracks oblique to the running direction. The method comprises the steps of deriving data that are essential for decoding digital picture image signals from the high efficiency encoded digital picture image signals, and recording the data for the particular speed reproduction mode operation while running the tape recording medium at a speed different from the recording speed on the positions of the tape recording medium traced by the rotary heads by performing the independent encoding in variable length separately for each of the azimuth channels so that the recorded data can be reproduced by either of the double azimuth heads and oppositely arranged mono-azimuth heads.

A further aspect of the present invention is a digital picture image signal recording method wherein the data are divided into two parts on the picture and recorded on each track and the recorded azimuth can be changed at each picture updating period in the particular speed reproduction.

Yet another aspect of the present invention is a digital picture image signal recording method wherein the data are divided into two parts on the picture and are further divided into N parts in each of the halved parts and recorded on each track so that the picture is updated for each N divided data and the recording azimuth can be changed whenever the picture image is updated.

Still another aspect of the present invention is a digital picture image signal recording or reproducing apparatus which is capable of recording digital picture image signals compressed by a high efficiency encoding technique on a tape recording medium running at a prescribed speed by forming tracks, which are mutually in different azimuths with adjacent tracks, sequentially and oblique to the running direction of the recording medium using rotary heads, and recording plural kinds of pilot signals with different frequencies on adjacent tracks which are cycling in a prescribed cycle period, and reproducing digital picture image signals while running the tape recording medium at multiple prescribed speeds faster than the recording speed. The apparatus is provided with data generating means to derive data which are essential for decoding signals from the digital picture image signals so that they can be reproduced by either double azimuth heads or oppositely arranged mono-azimuth heads, first buffer means comprising multiple buffers for temporarily storing derived data, first data rate conversion means for converting the digital picture image signal data rate into a faster prescribed data rate, recording system selecting means for selectively arranging data from the first data rate conversion means and multiple data from the first buffer means time series to form and output a data train corresponding to a prescribed tape format, recording means for recording the data train from the recording system selecting means and multiple pilot signals using the rotary heads, reproduction means for reproducing the data train and pilot signals by the rotary heads while running the tape recording medium at a speed responding to a control signal so as to perform the tracking control based on the pilot signals, reproduction system selecting means for selecting either output data which are essential for decoding the digital picture image signals or ordinary reproduced data from the reproduction means in response to a control signal showing whether the reproduction is at a two times speed, second buffer means for sequentially outputting data which are essential for decoding the digital picture image signals output from the reproduction system selecting means in the reproduction at a two times speed after holding them for a prescribed period, and second data rate conversion means for converting to output the data rate of ordinary reproduced data that are output from the reproduction system selecting means in the standard speed reproduction to the original data rate.

Another aspect of the present invention is a digital picture image signal recording or reproducing method further comprising the steps of setting the running speed of the tape recording medium during reproduction at multiple speeds which are submultiples or multiples of the number of tracks equivalent to a pilot signal cycle period, and establishing multiple data recording areas, each of which is independently provided for each speed, within the number of unit tracks and arranging the recording areas on positions symmetrically about points on the longitudinal axial line of the tape recording medium as if the oblique direction of the tracks is mapped perpendicularly to the longitudinal center line of the recording medium.

Still a futther aspect of the present invention is a digital picture image signal recording or reproducing method where all the tracks described above are formed by multiple rotary heads in different azimuths and the data recording areas for each reproducing speed are formed on tracks in the same azimuth.

Another aspect of the present invention is a digital picture image signal recording or reproducing apparatus further provided with means for adding a signal to the essential data to direct a running speed unit of the tape recording medium at a particular reproducing operation of the recorded data.

An additional aspect of the present invention is a digital picture image signal recording or reproducing apparatus further provided with means for adding a signal to the essential data to indicate whether the data are effective signals for reproduction.

In addition, another aspect of the present invention is a digital picture image signal recording or reproducing method wherein data for multiple reproducing speeds are recorded with a track range indication signal showing the units of the repetitive recording.

Moreover, another aspect of the present invention is a digital picture image signal recording or reproducing apparatus further provided with a means for detecting to determine a signal from the data recorded on and reproduced from the tape recording medium indicates that the data are effective signals, and means for displaying invalid data detected as a result of the discrimination.

Furthermore, an additional aspect of the present invention is a digital picture image signal recording or reproducing method further comprising the steps of detecting a signal showing the units of the repetitive recording from the reproduced data, judging based on the detected signal that one trace was repetitively performed by the rotary heads consecutively for each unit of tracks by more than the number of times determined by the spaces of the tracks, and rearranging the reproduced data in the same order as the order in the recording.

Still an additional aspect of the present invention is a digital picture image signal recording or reproducing method further comprising the steps of setting the reproduction speed of the tape recording medium at multiple speeds which are multiples of units of tracks equivalent to the pilot signal cycle period, deriving the essential data for decoding at each reproducing speed, and recording the essential data in the different recording areas of the tracks at each reproducing speed such that the amount of information differs for each reproducing speed and more information is provided for the lower reproducing speeds.

According to the invention data recording areas for the particular speed reproduction are provided in units of tracks that are discriminated by the pilot signals, particular speed reproduction becomes possible by discriminating the pilot signals only.

As the reproduction speed is determined based on the number of tracks that are discriminated by the pilot signals and track areas reproducible by the heads can be reserved widely at low speeds, the recording areas expand wider for lower reproduction speeds, more DCT low frequency component data and picture image data in a wider range than at higher speeds can be recorded or reproduced, and stabilized and high-quality picture images in respective particular speed reproductions are possible.

Particular speed reproduction data generated for particular speeds are recorded successively for a prescribed number of times determined by units of tracks at each track space traced by the reproducing heads at respective speeds, even when data becomes reproducible at any track in the particular speed reproduction, and particular speed reproduction data at the particular speeds can be reproduced for each unit of tracks.

Also, particular speed reproduction data areas are provided at symmetrical positions with respect to the center line of the recording medium as if the oblique direction of the tracks is mapped to the perpendicular direction with respect to the longitudinal center line of the recording medium, the reproduction at a given speed corresponds to the particular speed reproduction in the reverse direction, and reproduction of a wide particular speed reproduction data area containing large amounts of data is possible while preventing deterioration in picture quality at low speed.

In addition, particular speed reproduction data are encoded in variable length separately and independently and recorded on a magnetic tape for each azimuth channel so that they can be reproduced by both the double azimuth heads and the oppositely arranged mono-azimuth heads. It is possible to achieve a tape format for particular speed reproduction which is interchangeable for a digital VTR equipped with two kinds of different rotary heads.

By splitting picture image data that are to be recorded for each azimuth channel into two parts and changing a recording azimuth of the halved picture image data at every picture image updating period at the particular speed reproduction, it becomes possible to reproduce one picture image with certainty in spite of the small amount of information being reproduced, even when reproducing only one of the azimuth channels for not only the double azimuth heads but also the oppositely arranged mono-azimuth heads. This is because in the case of the mono-azimuth opposite heads, a picture image is updated by half at every update period and nearly one picture image can be reproduced in two times the updating period.

As a picture image is largely split into two parts, each of the split parts is further divided into N parts, and the picture image is updated for each of N divided parts, and by changing the recording azimuth of data in units of 1/N at the time of updating of the 1/N divided picture image, the 1/(2N) part of the picture image is reproduced at every updating period and approximately one picture image can be reproduced at 2N times of the updating period.

Even when a magnetic tape with data recorded using a digital VTR equipped with double azimuth heads is used on a mono-azimuth opposite head digital VTR, particular speed reproduction data of the mono-azimuth channel is reproduced independently and therefore, it becomes possible to provide interchangeability to a digital VTR equipped with different heads.

As the particular speed reproduction data areas are arranged on symmetrically about points on the longitudinal axial line of the tape recording medium as if the oblique direction of the tracks with respect to the longitudinal center line of the recording medium is mapped perpendicularly direction with respect to the longitudinal center line of the recording medium and the arrangement is repetitively performed in units of the tracks, the reproduction corresponding to an applicable speed becomes possible even in a particular speed reproduction at a two times speed in the reverse direction.

Moreover particular speed reproduction data recording areas for a single speed reproduction are set on a monoazimuth track, it becomes possible to obtain the same particular speed reproduction data by both a head in the construction for sequentially tracing tracks of respective azimuths one by one and a head in the construction for reproducing the recorded data by simultaneously tracing multiple azimuth tracks in the standard speed reproduction.

When selecting reproduction data fitted to a current reproducing speed, the reproduction data can be selected precisely by a prescribed identification signal added to each data without deriving it again from Track No., synch block ID and the like.

It becomes possible to provide a cheap recording apparatus without changing the recording areas by deleting the particular speed reproduction data generating means from the recording apparatus when more than one data generating means out of multiple particular speed reproduction data generating means are deleted and an identification number is added to data to be recorded in the recording areas of particular speed reproduction data at this deleted speed and ordinary reproducing data.

If the head tracing was carried out over the data repetitive recording areas, it becomes possible to rearrange data in the original data sequence using the data traced before and after the head tracing.

The amount of information is larger at lower reproducing speeds, and it is possible to prevent deterioration in the picture quality produced in the reproduction at a low speed and obtain easy to see, stabilized particular speed reproduction video at any reproducing speed.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 1(a) and 1(b) are diagrams showing a tape format for explaining the digital picture image signal recording or reproducing method and the reproduction signal envelopes of the reproducing heads at +4(−2), +8(−6) and +24(−22) times speeds of one embodiment of the present invention;

FIG. 3 is a diagram showing the construction of one Sync shown in FIG. 2;

FIG. 4 is a diagram showing the construction of frames that are used in the embodiments of the present invention;

FIG. 5 is a diagram showing the construction of the rotary drum equipped with the singular location double azimuth heads that are used in the embodiments of the present invention;

FIG. 26 is a table (TABLE 1) for explaining picture image updating sequences in the particular speed reproduction; and FIG. 27 is a table (TABLE 2) for explaining constructions of Sync block IDs.

DESCRIPTION OF THE PREFERRED EMBODIMENTS

The present invention will be described in detail with reference to FIGS. 1(a) through 19, 26 and 27.

Before explaining the digital picture image signal recording or reproducing method of one embodiment of the present invention in FIGS. 1(a) through 3, the principle of this embodiment will be explained referring to FIGS. 4 through 7. Further, the international MPEG standard is used as the high efficiency encoding standard in this embodiment.

FIG. 4 shows the construction of frames that are used in the embodiment of the present invention.

As shown in FIG. 4, one GOP (Group of Pictures in the MPEG standard) is comprised of one I-frame, three P-frames and eight B-frames, for a total of 12 frames. The construction of the rotary heads of a VTR used in the embodiment of the present invention are as shown in FIG. 5, that is, a rotary drum 11 is provided with singular location double azimuth heads 12, 13 on the top. The tape winding angle is approximately 180° rotating the rotary head at 9000 rpm secures the recording areas of 10 tracks per ⅟30 sec. Further, a pair of double azimuth heads are provided at the locations opposite to the double azimuth heads 12, 13 on the rotary drum so the same recording areas can be secured even when these heads are rotated at 4500 rpm.

Figure 6:
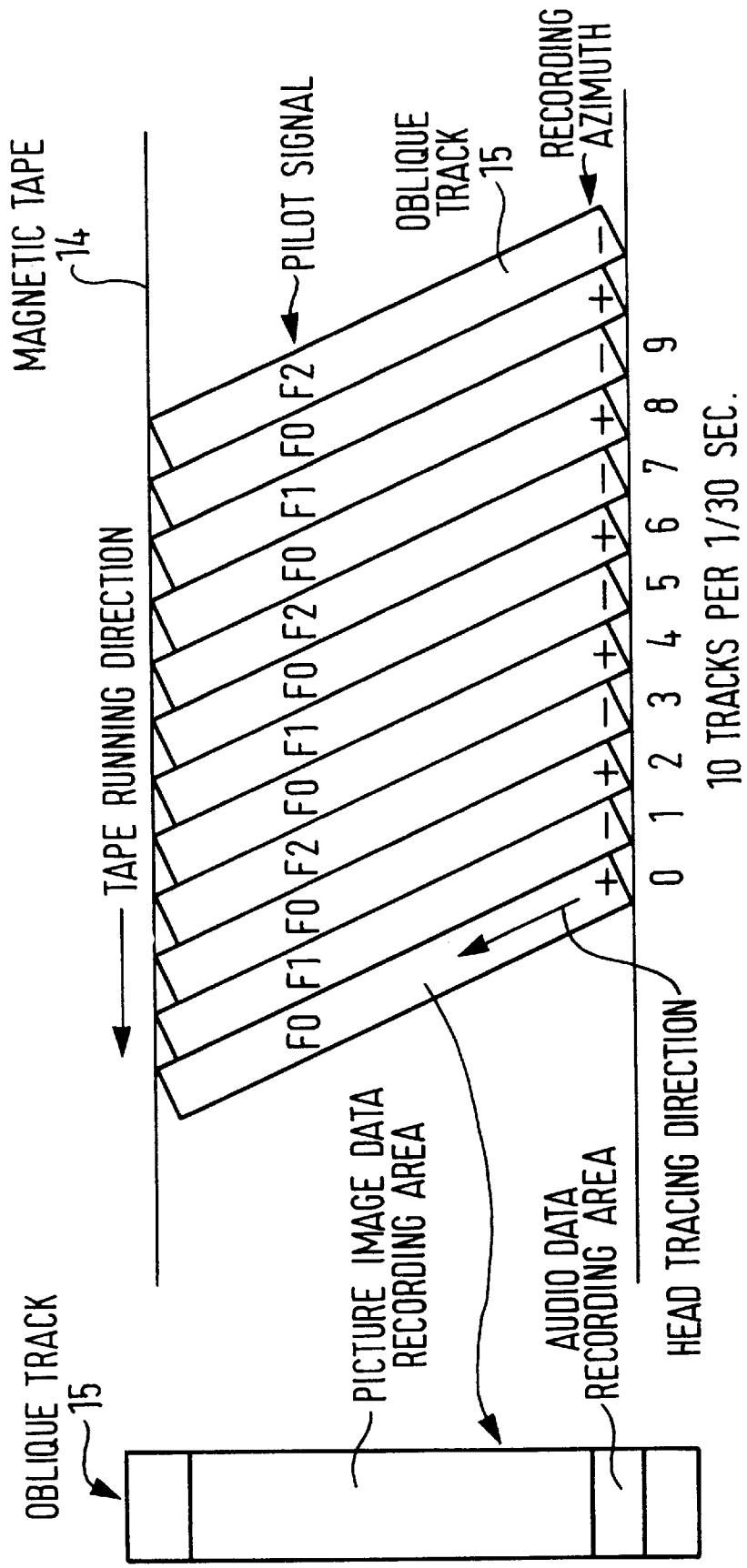
FIG. 6 is a diagram showing the VTR's tape format that is used in the embodiments of the present invention.

The tape format of a VTR used in one embodiment of the present invention is shown in FIG. 6. Data are recorded or reproduced on or from oblique tracks 15 on a magnetic tape 14 using the rotary head shown in FIG. 5. Pilot signals F1, F0, F2, which are required for tracking, are recorded on the tracks 15 in a F0, F1, F0, F2 sequence. On the tracks 15, the pilot signals are recorded by superimposing them over picture image data and voice data to be recorded in a cycle period of four signals F0, F1, F0, F2 by forming an opposite azimuth with the adjacent track. Each track 15 is provided with a picture image data area and a voice data area as shown in FIG. 6. The tape is in a format where 10 tracks equals ⅟30 sec., that is, equivalent to one frame time. Hereinafter, the F1, F0, F2 pilot signals will be used to discriminate the tracks 15.

Figure 7:
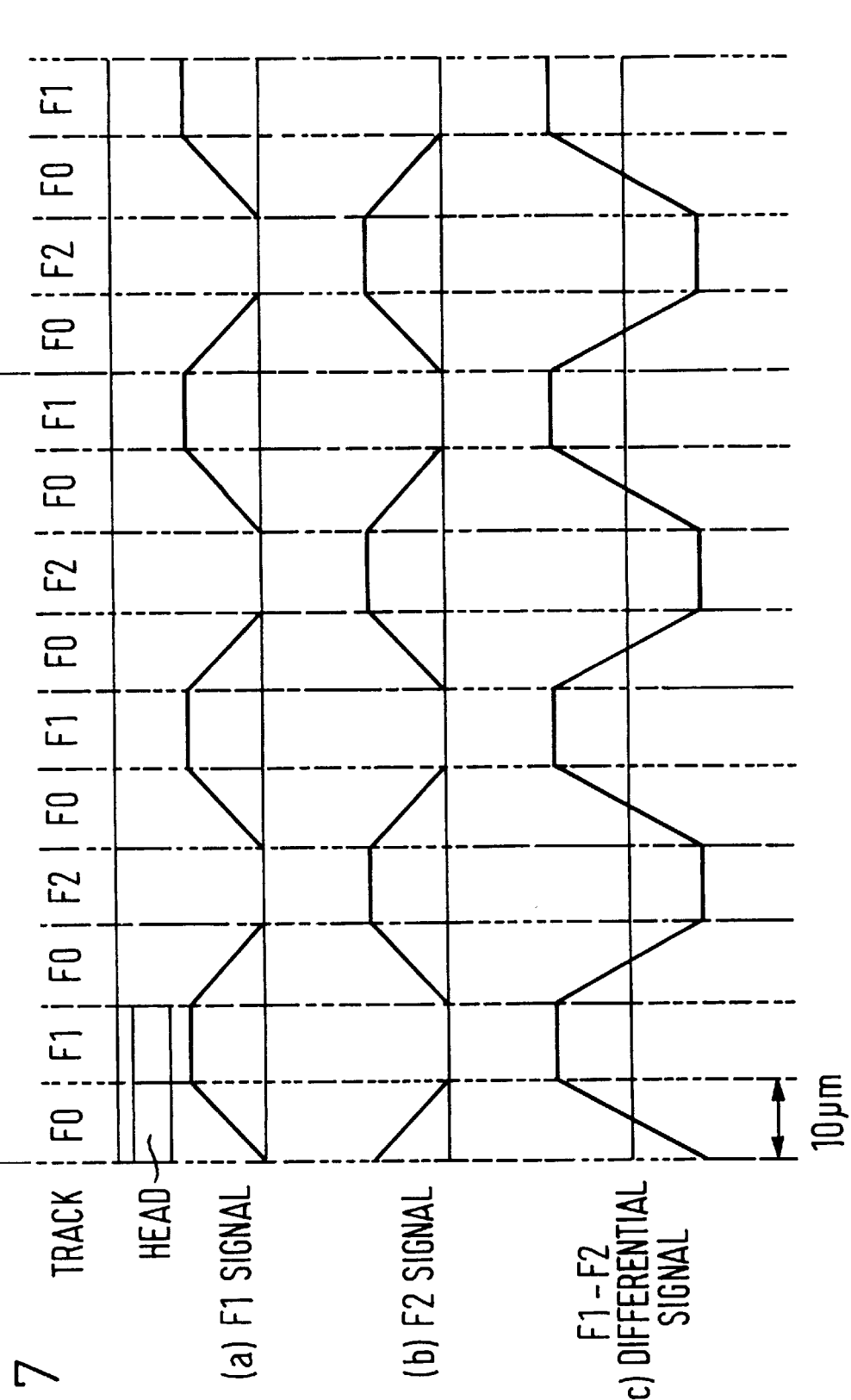
FIG. 7 is a diagram showing generated voltages of the pilot signals F1 and F2 in the VTR that are used in the embodiments of the present invention.

Voltages generated for the pilot signals F1 and F2 at the center of the reproducing head width 20 μm against the track width 10 μm are shown in waveforms (a) and (b) of FIG. 7. A difference in reproduction signal envelope voltages of the pilot signals F1 and F2 is shown in waveform (c) as F1−F2.

At the portions showing the change of the differential voltage F1−F2 shown in waveform (c), it is seen that the differential voltage becomes 0 V when the center of the head comes to the center of the track F0. That is, it becomes possible to perform the tracking by controlling a tape-carrying servo motor so that the differential voltage F1–F2 becomes 0 V. Further, by checking the inclination of the differential voltage F1–F2 when the tracking is performed, it is possible to discriminate which F0 is the applicable signal period among the F0, F1, F0, F2 periods. For instance, if the differential voltage F1–F2 is ascending at the right side, the signal period F0 is the one between F2 and F1 in the sequence, and if the differential voltage F1–F2 is descending at the right side, the signal period F0 is the one between F1 and F2 in the sequence.

Figure 1A:
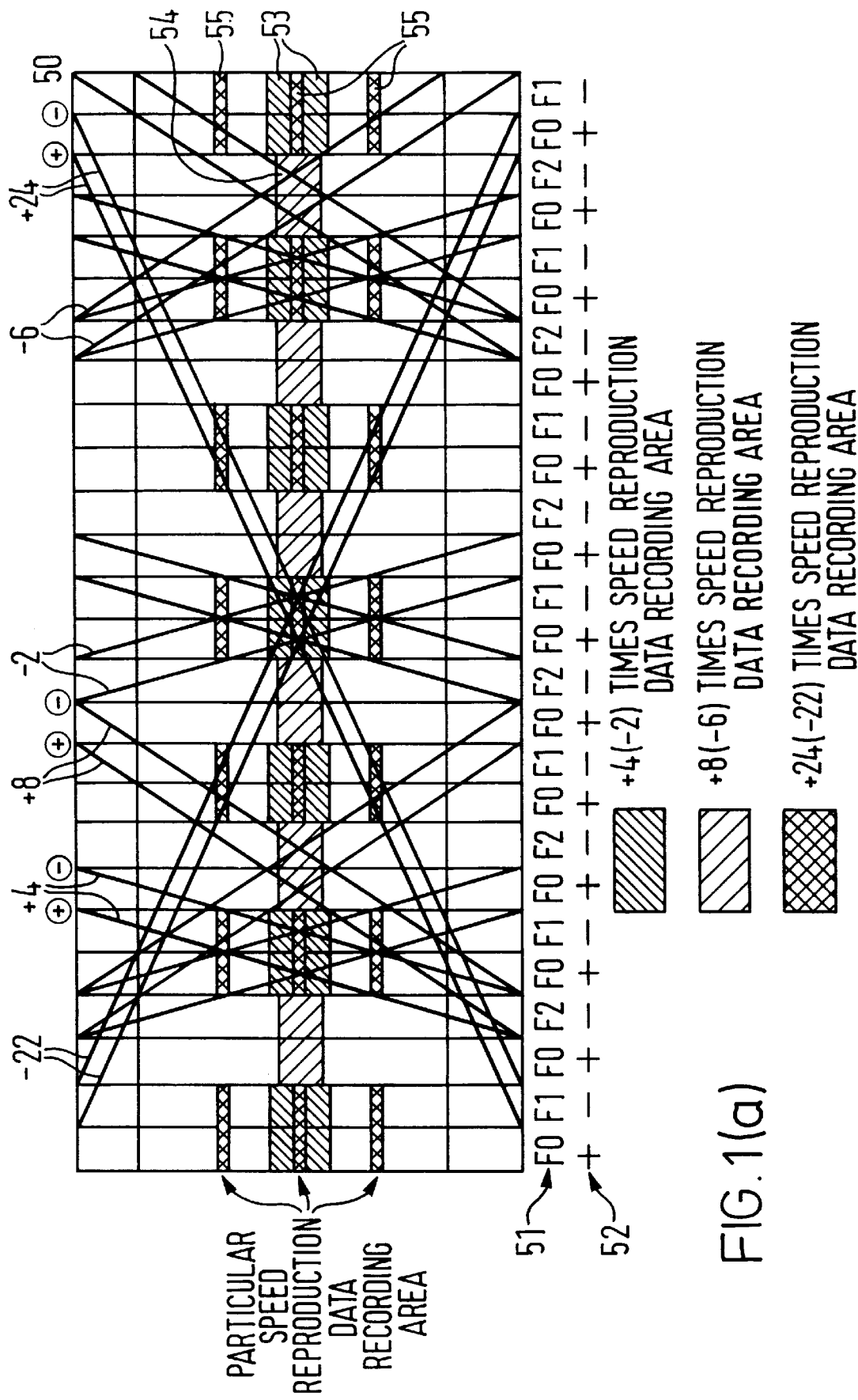

FIG. 1(a) is a schematic diagram of a tape format for explaining one example of the digital picture image signal recording or reproducing method according to the present invention.

FIG. 1(a) shows scanning loci of the reproducing heads at the +4(−2), +8(−6) and +24(−22) times speeds with respect to the tape format, together with a particular speed reproduction data recording area according to the present invention. Two scanning loci of the reproducing heads at respective reproducing speeds present the scanning loci of the centers of two of the "+" and "−" azimuth heads 12, 13 comprising the singular location double azimuth heads shown in FIG. 5. Pilot signals are shown by reference numeral 51 and azimuths of the recording tracks are shown by reference numeral 52. Reproducing head azimuths in the particular speed reproduction are shown by "+" and "−" and by reference numeral 50.

FIG. 1(b) shows the reproduction signal envelopes obtained by the reproducing heads at the +4(−2), +8(−6) and +24(−22) times speeds. The reproduction signal envelopes here are the envelopes made by the same 20 μm wide head against the 10 μm wide track. In FIG. 1(b), data recording areas for +4(−2) times speed, +8(−6) times speed, and +24(−22) times speed are provided in areas 53, 54, and 55, respectively. Here, the number of tracks equivalent to the pilot signal repetitive period, that is, 4 tracks, are made into one group. As shown in FIG. 1(a), for each group comprising 4 tracks, the +4(−2) times speed data recording areas 53, +8(−6) times speed data recording area 54, and +24(−22) times speed areas 55 have been continuously recorded over two tracks.

From FIG. 1(a), since the particular speed reproduction data area of the tape format is a four track period, the speed unit of the particular speed reproduction is a multiple of four (e.g., +4, +8, +24) in the forward direction and in the reverse direction, a number subtracted by 2 from a multiple of four (e.g., −2, −6, −22) in the reverse direction are used, there is always a point where the tracking is applied in all four tracks, which is the pilot signal period.

The tracking method at this time will be explained. In the particular speed reproduction at the +4(−2) and +24(−22) times speeds, it is possible to carry out the tracking by detecting pilot signals at the center of the track by controlling the differential voltage F1–F2 shown in FIG. 7 to incline upward at the right side to 0 V. Likewise, the reproduction is possible at the +8(−6) times speed by controlling the differential voltage F1–F2 to incline downward at the right side to 0 V at the center of the track.

Although the above description assumes that there is one tracking point in four tracks at respective speeds in the particular speed reproduction, some groups may be skipped at every head tracing. Thus, the same particular speed reproduction data can be recorded successively for two adjacent groups of tracks at the +4(−2) times speed, four groups of tracks at the +8(−6) times speed and twelve groups of tracks at the +24(−22) times speed in order to maintain the continuity of data for particular speed reproduction. This particular recording arrangement will maintain the continuity of particular speed reproduction data when the tracking is carried out at any tracking point, and it becomes possible to generate high efficiency encoded data for particular speed reproduction utilizing the relationship with preceding data and improve picture quality in the particular speed reproduction with less recording capacity, and the hardware scale is cut down as there are fewer changes when generating particular speed reproduction data from standard speed reproduction data.

Figure 2:
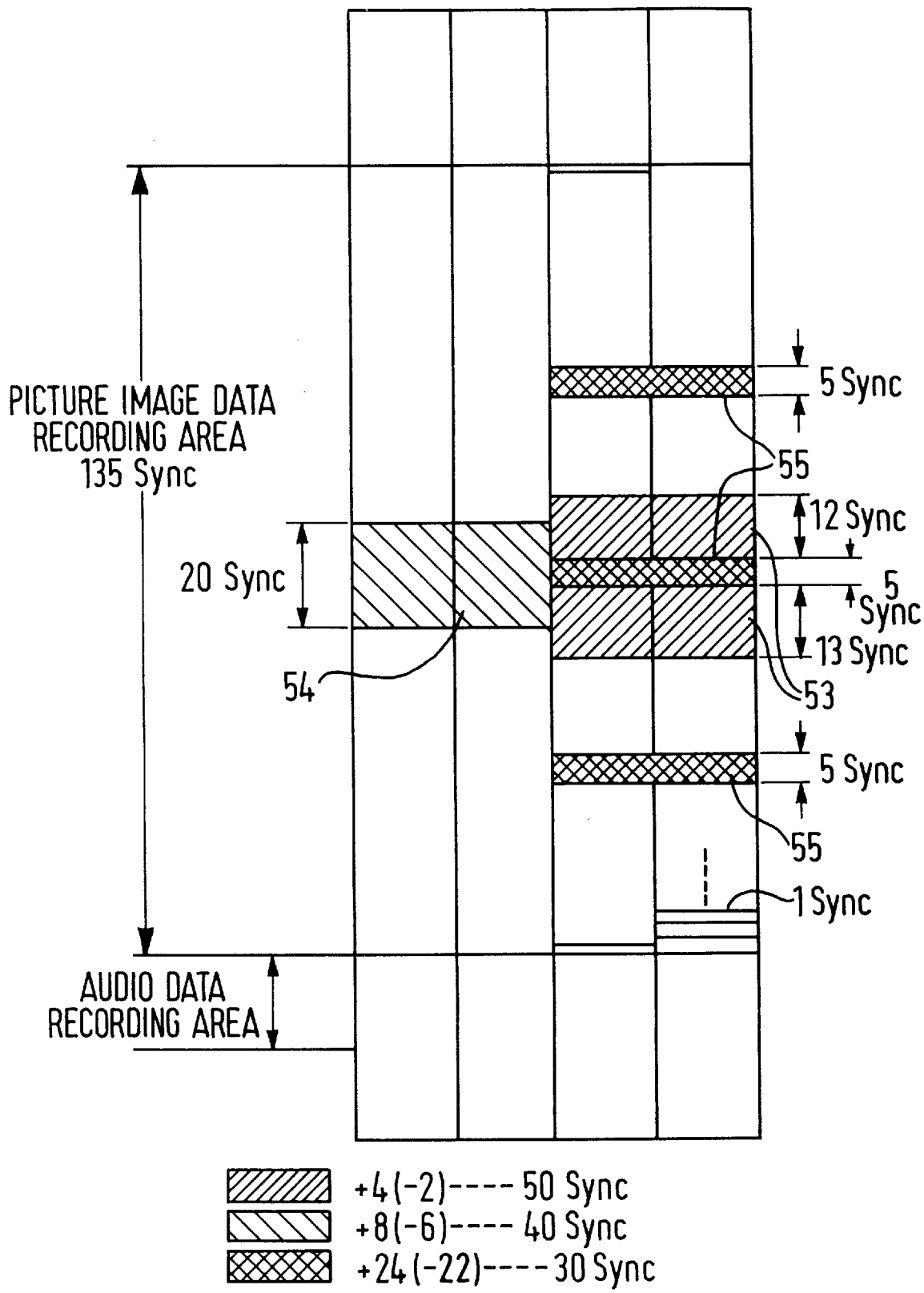
FIG. 2 is a diagram showing the detailed tape format shown in FIG. 1.

The tape format shown in FIGS. 1(a) and 1(b) are shown in FIG. 2 in more detail.

In FIG. 2, sections denoted by reference numeral 53 are recording areas for data associated with the +4(−2) times speed mode operation, which comprise two areas arranged symmetrically with respect to the longitudinal axis of a tape. Sections denoted by reference numeral 54 are recording areas for data associated with the +8(−6) times speed mode operation, comprising one area arranged symmetrically with respect to the longitudinal axis of a tape. Sections denoted by reference numeral 55 are recording areas for data associated with the +24(−22) times speed mode operation, comprising three areas arranged symmetrically with respect to the longitudinal axis of a tape. Each of the tracks is provided with a picture image data area and a voice data area. The picture image data recording area is divided into 135 Sync areas. The particular speed reproduction data area has a recording capacity of 25 Syncs per track for the +4(−2) times speed, a recording capacity of 20 Syncs per track for the +8(−6) times speed, and a recording capacity of 15 Syncs per track for the +24(−22) times speed. Thus, in the case of four tracks grouped together into one unit, there is a recording capacity of 50 Syncs at the +4(−2) times speed, a recording capacity of 40 Syncs at the +8(−6) times speed and a recording capacity of 30 Syncs at the +24(−22) times speed.

A unit construction of a Sync is shown in FIG. 3.

As shown in FIG. 3, the Sync is comprised of a sync pattern SY, identification information ID containing a recorded track number or other information, a picture image data recording area PD, and an error detection and correction parity P, wherein the picture image data recording area PD has 77 bytes per Sync.

FIG. 26 is a table (TABLE 1) illustrating picture image updating sequences in the particular speed reproduction.

From TABLE 1, the frame is updated every ¹⁄₁₀ sec. at the +4(−2) and +8(−6) times speeds and every ¹⁄₁₅ sec. at the +24(−22) times speed. The amount of data in one frame at this time is 750 Syncs at the +4(−2) times speed, 600 Syncs at the +8(−6) times speed and 300 Syncs at the +24(−22) times speed. Since the amount of data increases at lower speeds, some of the AC component of the DCT coefficient can be recorded, and the picture quality is improved at low speeds.

Next, the construction of a digital VTR achieving the above principle will be explained.

Figure 8:
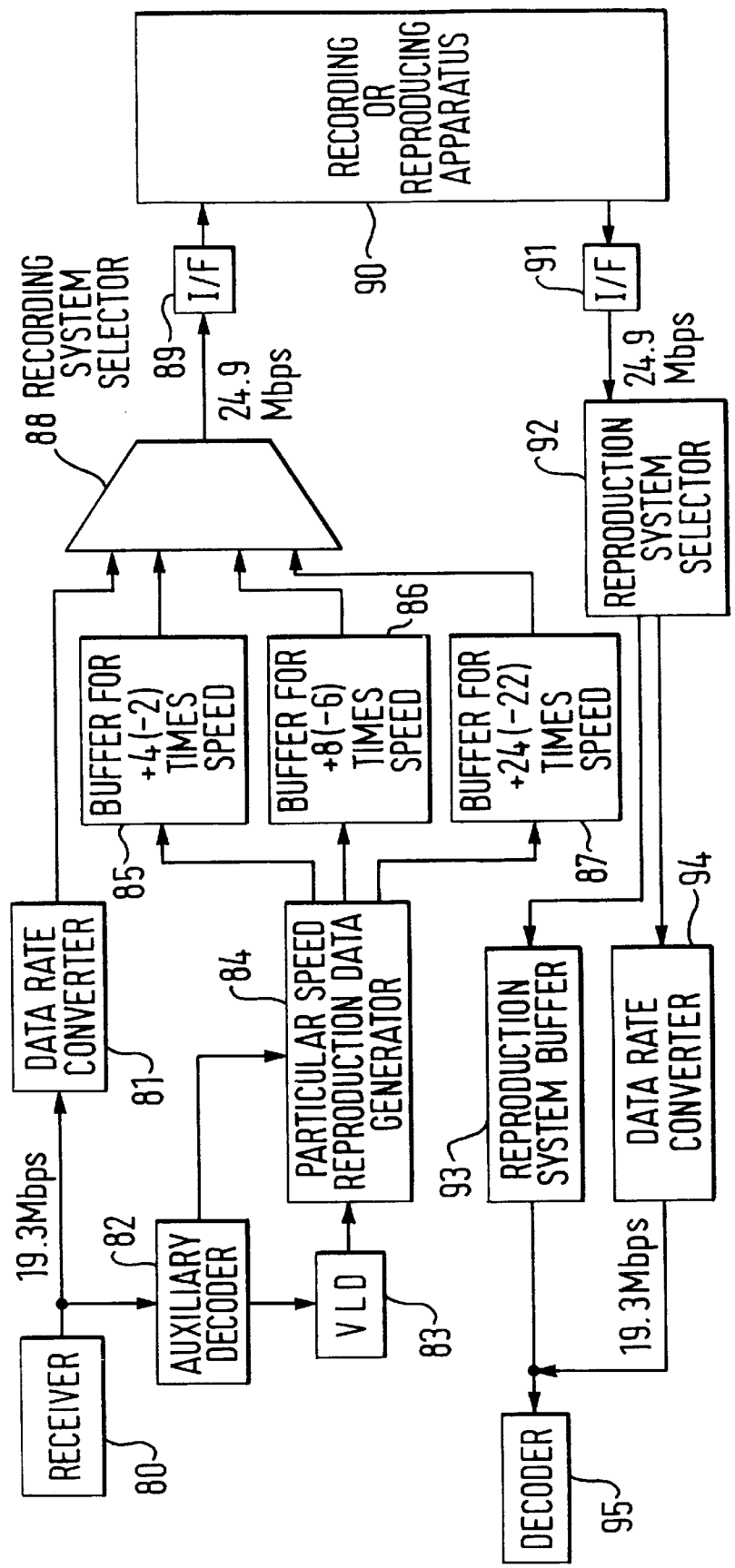
FIG. 8 is a block diagram showing the construction of the digital VTR involved of one embodiment of the present invention.

FIG. 8 is a block diagram showing the construction of a digital VTR involved in one embodiment of the present invention.

In FIG. 8, a receiver 80 receives data being transmitted through an antenna or a cable and outputs an MPEG bit stream; that is, intra-frame or inter-frame compressed picture image data (one GOP frame data) encoded in variable length after the DCT process is output from the receiver 80.

A data rate converter 81 converts the data rate (for instance, 19.3 Mbps) of the MPEG bit stream from the output of the receiver 80 into a data rate (for instance, 24.9 Mbps) of the magnetic recording or reproducing apparatus. The data at the converted data rate is output in synchronism with data output from a +4(−2) times speed buffer 85, a +8(−6) times speed buffer 86 and a +24(−22) times speed buffer 87. That is, the data converted into the data rate of the tape format for the magnetic recording or reproducing apparatus 90 is output from the data rate converter 81. For the data having a converted data rate, an empty area large enough to contain data from buffers 85A through 87B, which are described later, is formed. An auxiliary decoder 82 takes out only the I frame picture image from the MPEG bit stream, and decodes and outputs I frame picture image data in variable length using a variable length decoder (VLD) 83. A particular speed reproduction data generating circuit 84, takes out three coefficients from the DC component and low frequency component of the AC coefficient of the data output from the variable length decoder 83, obtains various header information required for reproduction of the MPEG data from the auxiliary decoder 82, and outputs the coefficients to the +4(−2) times speed buffer 85. The generating circuit also takes two coefficients out of the DC component and low frequency component of the AC coefficient of picture image data, and outputs the coefficients to the +8(−6) times speed buffer 86, and takes out only the DC component of picture image data and outputs it to the +24(−22) times speed buffer 87. The buffers 85A through 87B store data from the particular speed reproduction data generator 84. These stored data are then read out sequentially into the tape format of the magnetic recording or reproducing apparatus 90 through a recording system selector 88. The recording system selector 88 selects data which is output from the data rate conversion circuit 81 and data which is output from the buffers 85A through 87B and outputs them to an interface (I/F) 89 to form a data stream in the tape format of the magnetic recording or reproducing apparatus 90. The interface (I/F) 89 adds an error correction parity, sync signal and ID signal to the data output from the recording system selector 88 and outputs the resultant data to the magnetic recording or reproducing apparatus 90. The magnetic recording or reproducing apparatus 90 is an apparatus which records supplied data and pilot signals using a rotary head (see FIG. 5) equipped with the singular location double azimuth heads at 10 tracks per 1/30 sec. The apparatus 90 also reproduces the recorded data while carrying out the tracking based on the pilot signals. An interface 91 performs the error correction on the reproduced data from the recording or reproducing apparatus 90 and outputs the corrected data. A reproduction system selector 92 selects a destination for data output according to an external control signal showing whether the data is for a particular speed reproduction. The data is output to a data rate conversion circuit 94 if the data is for standard speed reproduction and to a reproduction system buffer 93 if the data is for a particular speed reproduction. In the data rate conversion circuit 94, ordinary reproduced data from the magnetic recording or reproducing apparatus 90 is output after converting its data rate to a data rate (for instance, 19.3 Mbps) required by a decoder 95. The reproduction system buffer 93 stores one frame of the particular speed reproduction data output from the reproduction system selector 92 to make it a proper picture image. For particular speed reproduction in the normal direction, the data for one frame is stored and then read out in the same order it is stored and output to the decoder 95. For reproduction in the reverse direction, the data is read out in the reverse order as the storage order and output to the decoder 95. The decoder 95 decodes the MPEG bit stream, and after the D/A conversion, outputs analog picture image signals and voice signals.

Figure 9:
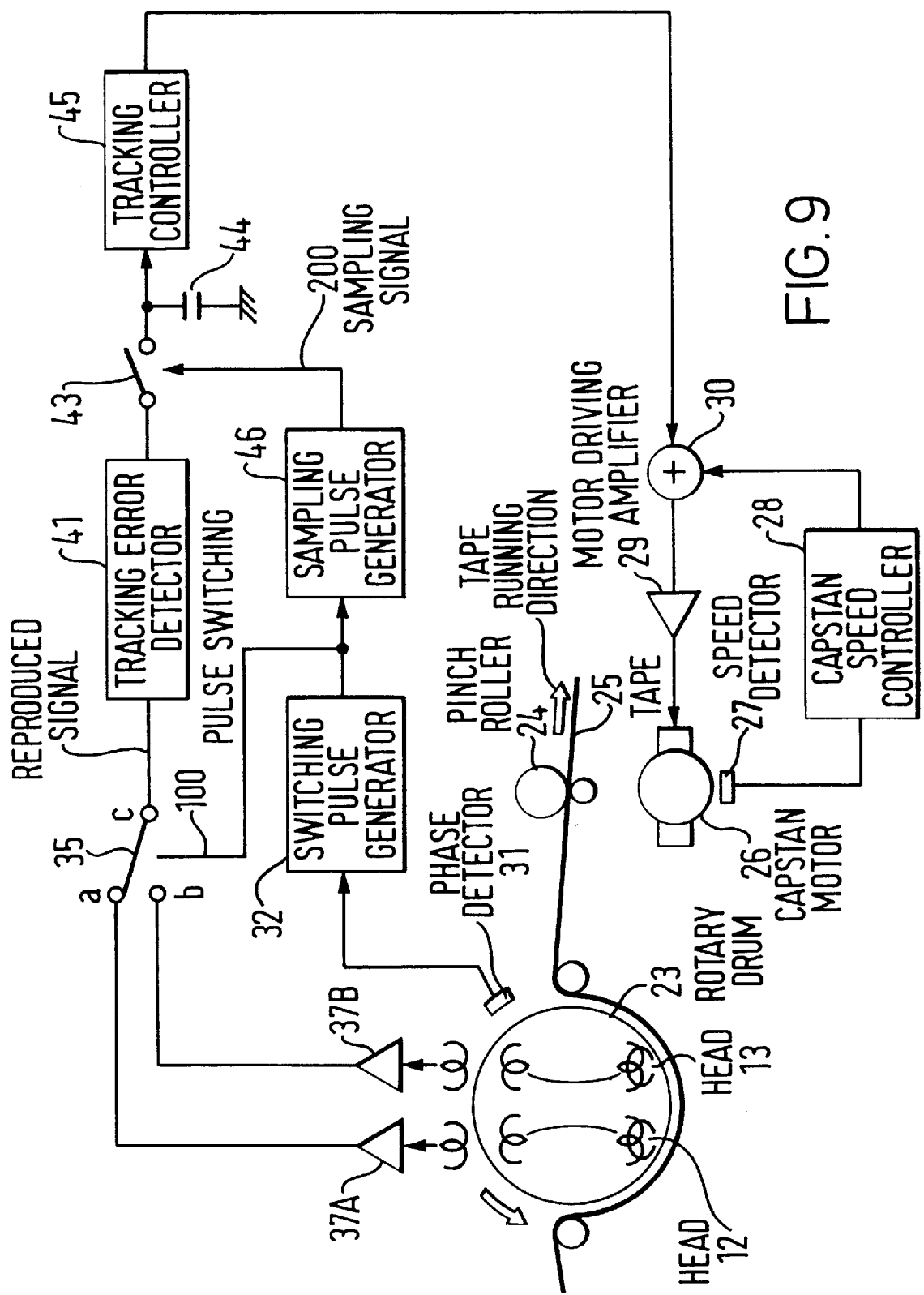
FIG. 9 is a block diagram showing the tracking control system that is used in the magnetic recording or reproducing apparatus of the present invention.

FIG. 9 shows a block diagram of the tracking control system which is used in the magnetic recording or reproducing apparatus 90. Pilot signals F1, F0 and F2 for the tracking operation are recorded on the recording tracks of a tape 25. In the reproduction, signals reproduced by the heads 12, 13 are amplified by preamplifiers 37A, 37B and input to terminals a, b of a switch 35. As the terminals a, b of the switch 35 are alternately selected by a switching pulse 100 generated by a switching pulse generator 32, continuously reproduced signals are obtained through a terminal c of the switch 35 and are input to a tracking error detector 41. The switching pulse generator 32 generates the switching pulse 100 based on a phase pulse proportional to the rotary phase of a rotary drum 23 that is obtained from a phase detector 31.

The tracking error detector 41 takes the pilot signal components F1, F0, F2 out of the input reproduced signals and generates error signals corresponding to F1, F0, F2 indicating the bias of signals crosstalking from the adjacent tracks at the left and right of the track currently being traced by the head. The tracking error detector 41 then outputs the error signals to a switch 43. As the switch 43 is turned ON or OFF based on a sampling signal 200 generated from a sampling pulse generator 46, the output from the tracking error detector 41 is held in a sampling hold circuit comprising the switch 43 and a capacitor 44 for a fixed period. This held signal is input to a tracking controller 45. The sampling pulse generator 46 generates the sampling signal 200 based on the switching pulse 100 generated from the switching pulse generator 32.

The tracking controller 45 outputs the error signal to an adder 30 after executing gain adjustment and phase compensation. The error signal is added to a signal output from a capstan speed controller 28 in the adder 30, and the added signal is input to a motor driving amplifier 29. The motor driving amplifier 29 controls the rotation of a capstan motor 26 to bring the error signal to a prescribed value according to this input signal. The rotational force of the capstan motor 26 is transmitted to the tape 25 through a pinch roller 24, and the tape is forced to run in the direction shown by the arrow in FIG. 9. At this time, the running phase (tracking) of the tape 25 is controlled to stay at a constant level by an error signal output from the tracking controller 45. Further, the running speed of the tape can be set by the speed controller 28, and its running direction can be switched by changing the rotational direction of the capstan motor 26 through the motor driving amplifier 29. Thus, particular reproduction speeds in the forward or reverse directions can be set by these circuits.

In the embodiment described above (FIGS. 1 through 9), the particular speed reproduction method and its tape format correspond to the singular location double azimuth head construction shown in FIG. 5. Next, the particular speed reproduction method and the tape format corresponding to the head construction of both the singular location double azimuth heads and the oppositely arranged mono-azimuth heads will be explained.

Figure 10:
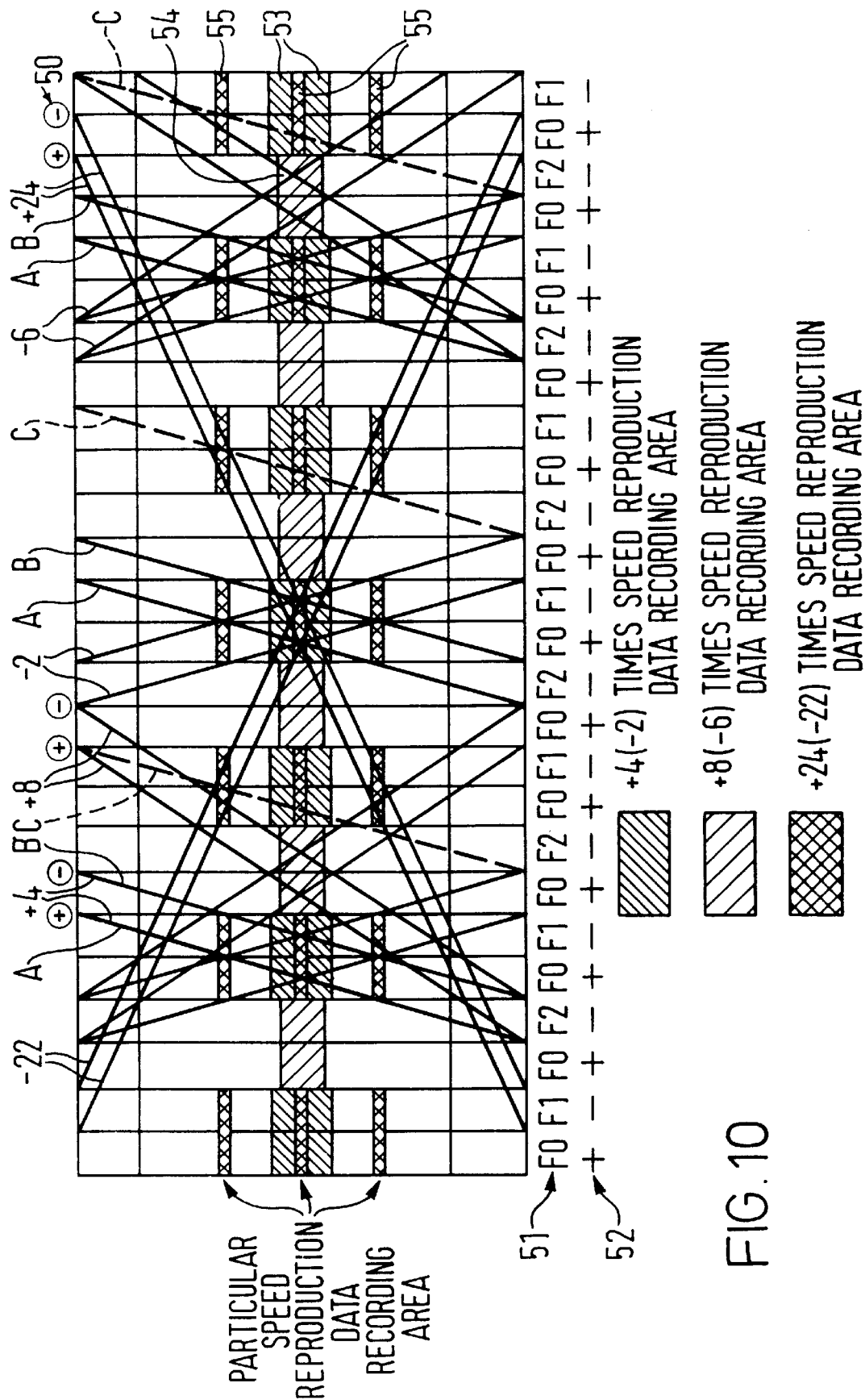
FIG. 10 is a diagram showing the tape format for explaining the digital picture image signal recording or reproducing method in another embodiment of the present invention.

FIG. 10 shows the particular speed reproduction tape format for recording using a digital VTR equipped with the singular location double azimuth heads like in FIG. 1(a). Here, the data area for the particular speed reproduction at a four times speed extends over two adjacent tracks indicated by reference numeral 53 and are arranged on both upper and lower areas symmetrically with respect to the center axis of each track length. The particular speed reproduction data area on the left track of every two adjacent tracks is the "+" azimuth recording area, while the particular speed reproduction data area on the right track is the "−" azimuth recording area. For reproduction at four times speed, the scanning locus of the "+" azimuth head of the singular location double azimuth heads is as shown by A in FIG. 10 and the head scanning locus A traces the "+" azimuth recording area of the data area for the four times speed reproduction. Further, the scanning locus of the "+" azimuth head is as shown by B in FIG. 10, and the scanning locus B traces the "−" azimuth recording area of the four times speed reproduction data area. Accordingly, the scanning loci of the singular location double azimuth heads take pairs of lines A, B.

Figure 21:
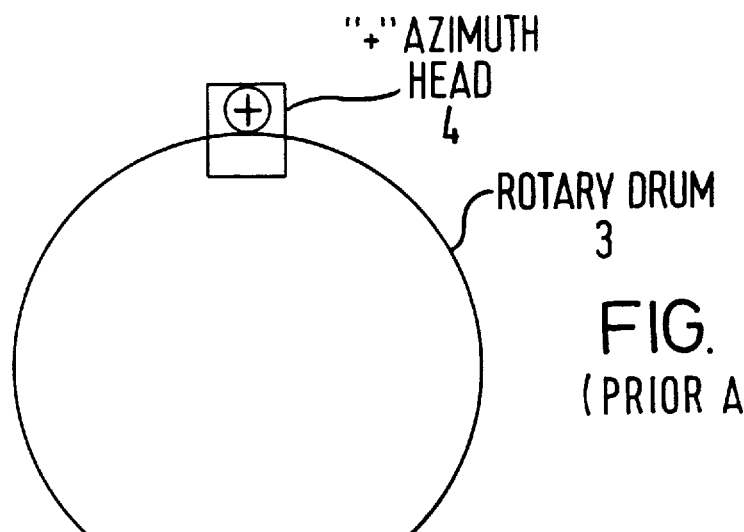
FIG. 21 is a diagram showing the construction of a rotary drum equipped with oppositely arranged monoazimuth heads.
Figure 22:
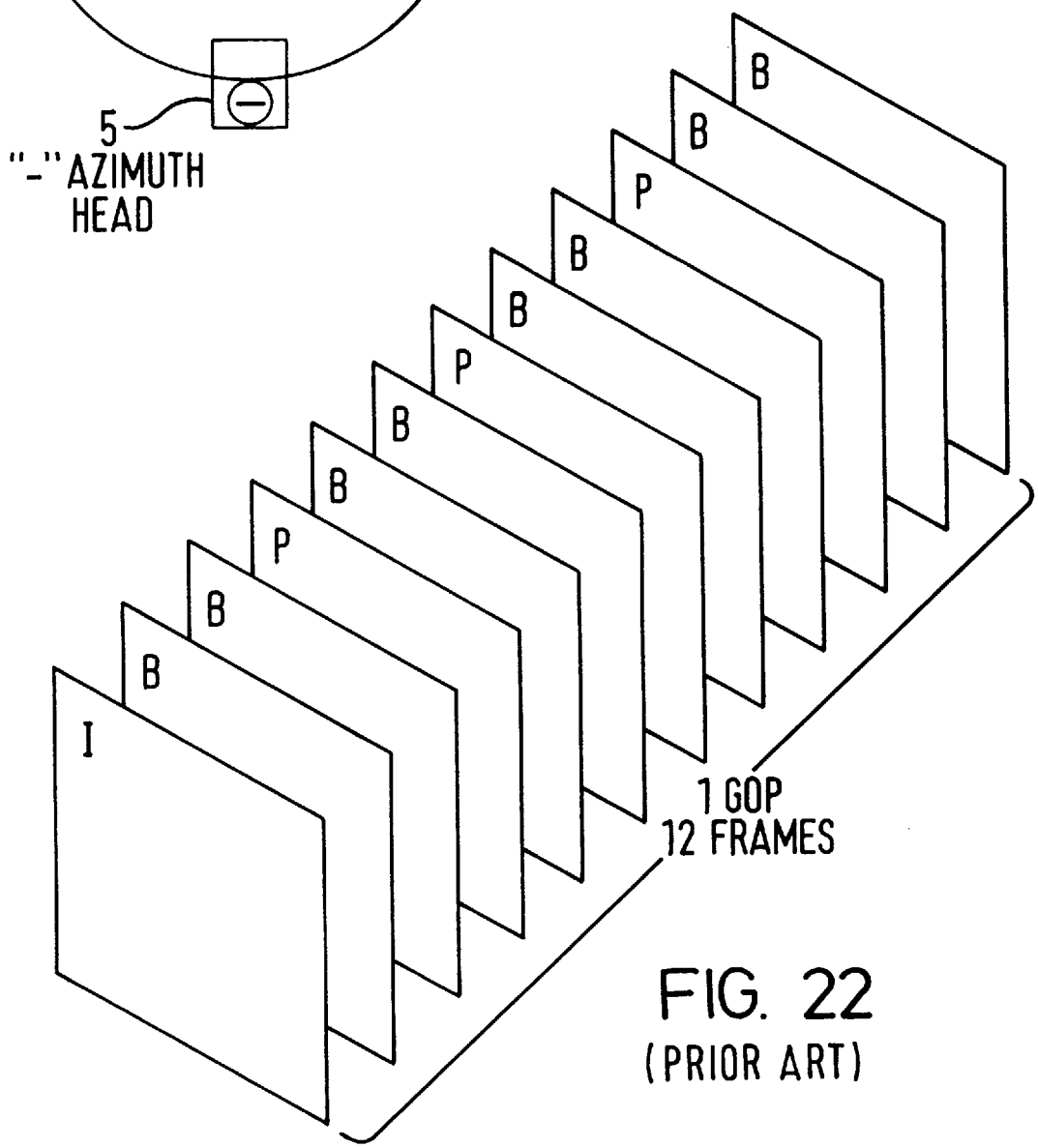
FIG. 22 is a diagram showing the picture image construction of one GOP in the MPEG standard.
Figure 23A:
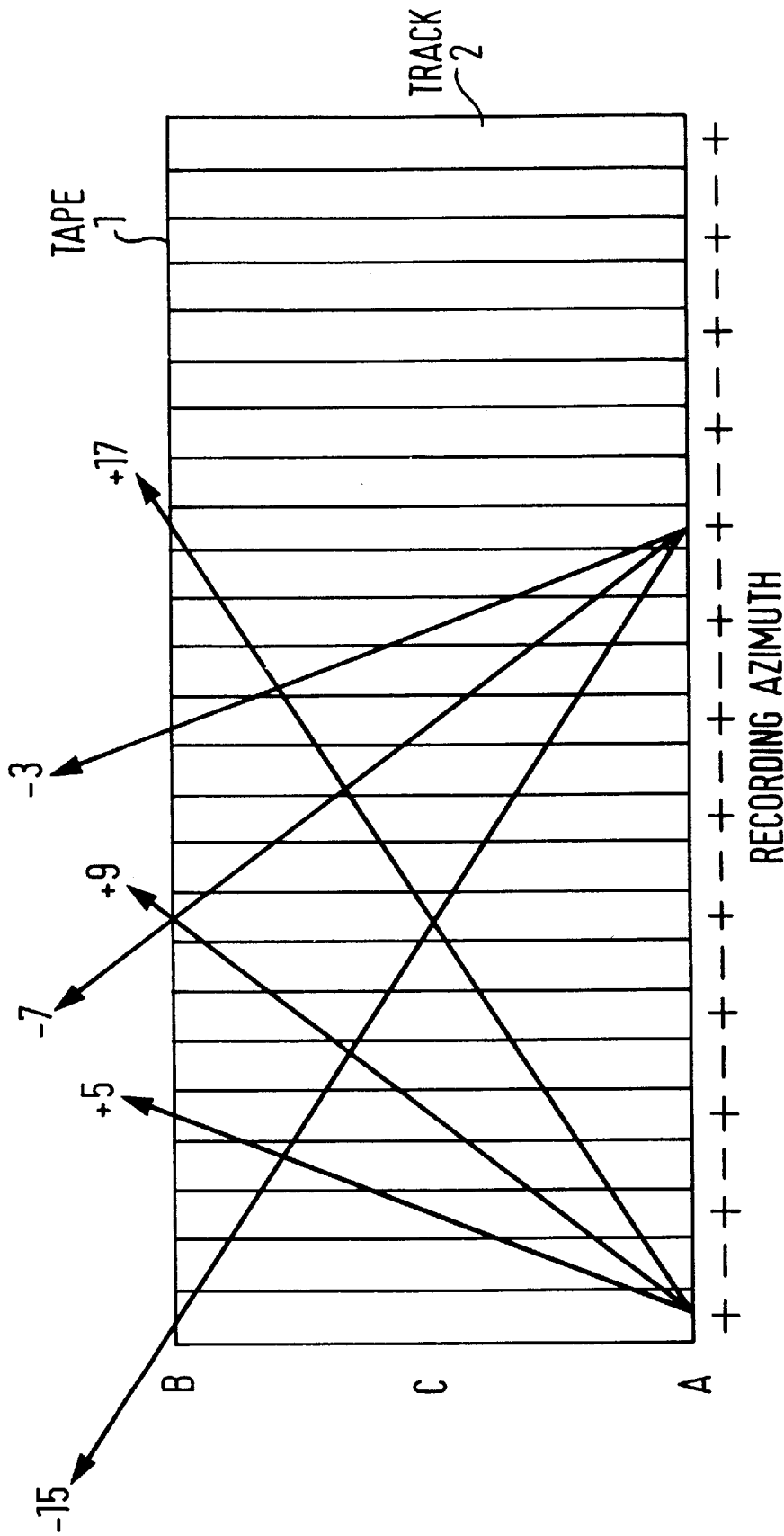
FIGS. 23(a) and 23(b) are diagrams showing the relationship between the scanning loci of the heads and the reproduction signal envelopes at +5(−3), +9(−7) and +17(−15) times speeds.
Figure 23B:
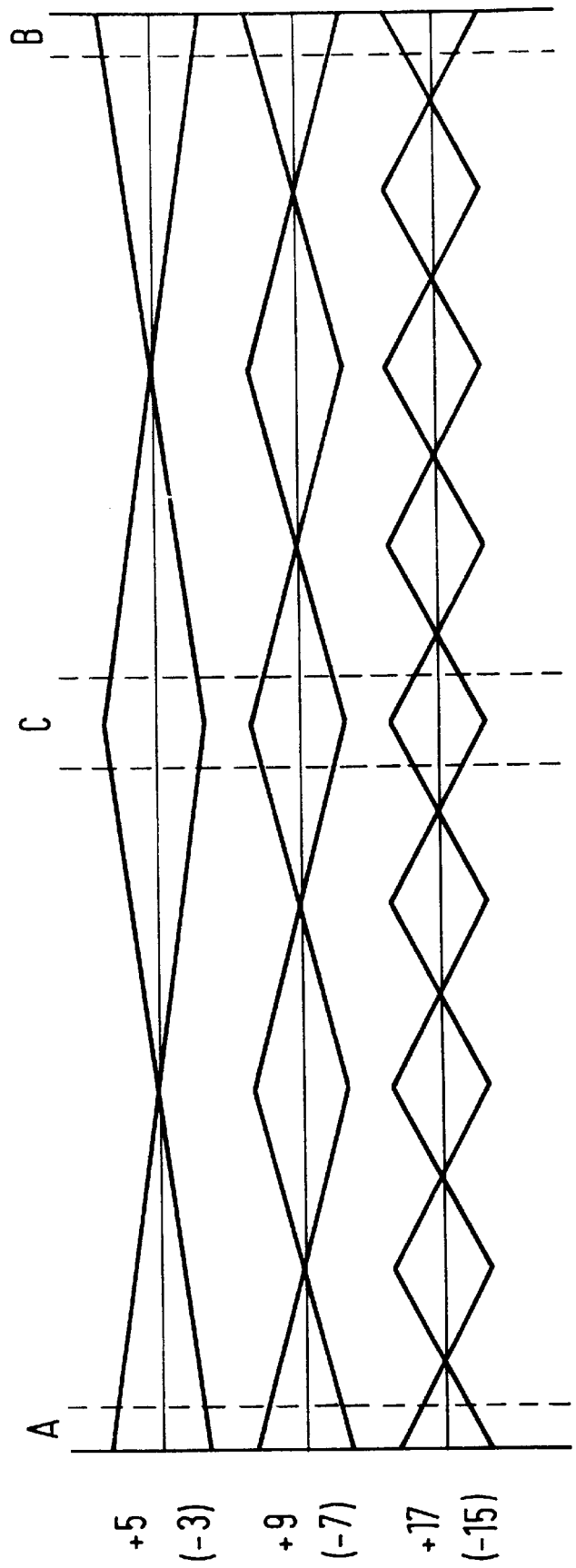
Figure 24:
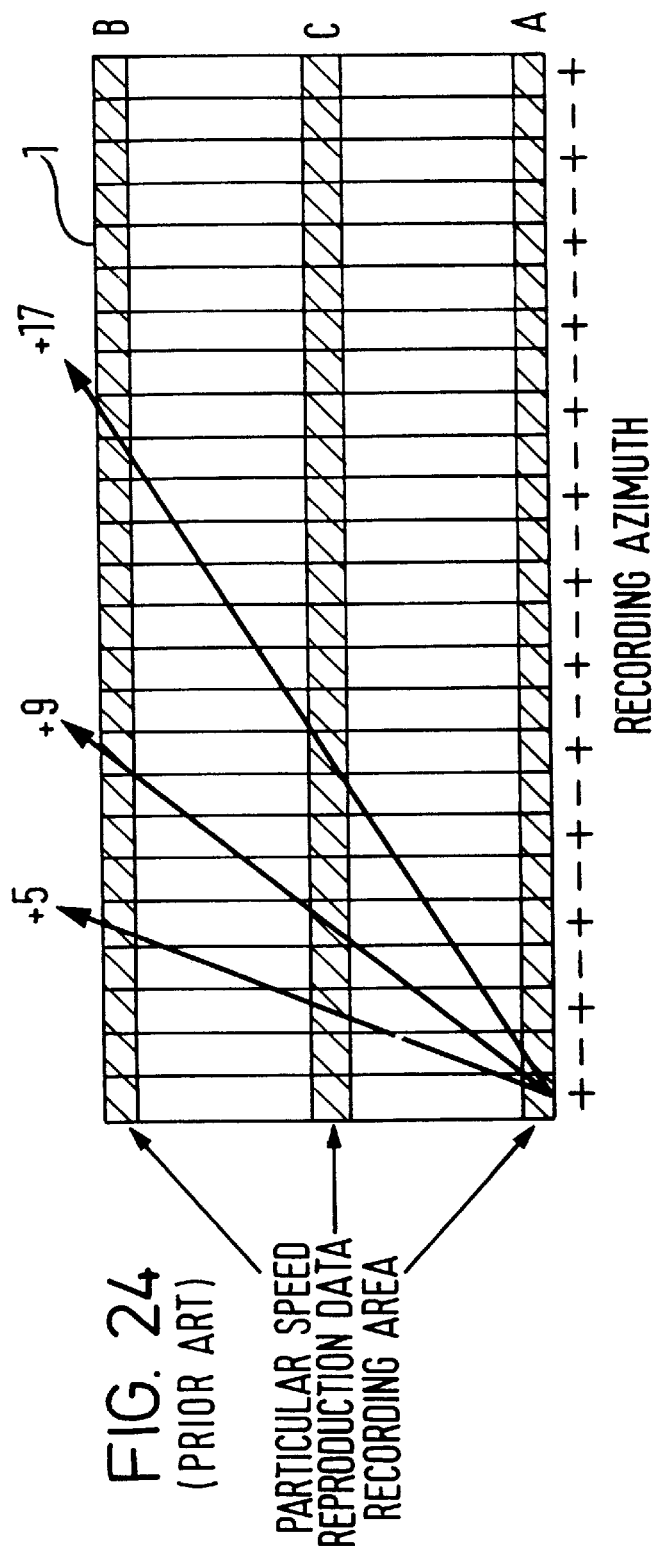
FIG. 24 is a diagram, showing the particular speed reproduction area that is recorded on a tape for performing a conventional particular speed reproduction.
Figure 25:
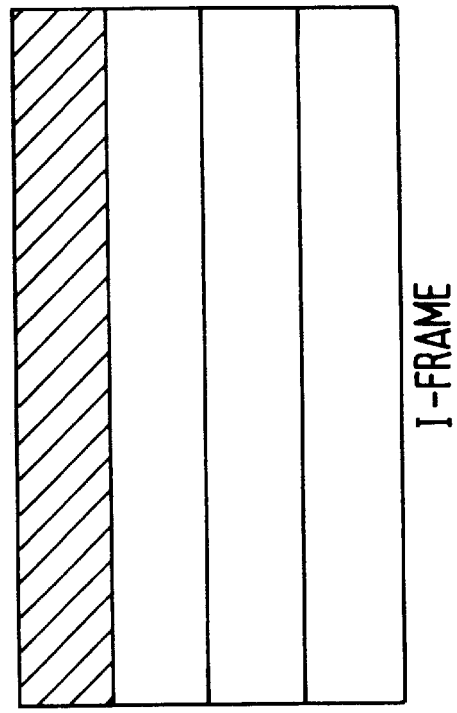
FIG. 25 is a diagram showing I-frame data that is used for the particular speed reproduction.

Performance of the particular speed reproduction using the oppositely arranged mono-azimuth heads as shown in FIG. 21 for the tape format shown in FIG. 10 (see also FIG. 1(*a*)) with data recorded using the singular location double azimuth heads will now be explained. The rotating speed of the rotary drum is assumed to be the same as the rotating speed of the singular location double azimuth heads. For reproduction at four times speed, the scanning locus of a "+" azimuth head 4 in the reproduction is shown by the symbol A in FIG. 10. The scanning locus of a "−" azimuth head 5 shown in FIG. 21 opposite to the "+" azimuth head 4 will be the scanning locus (indicated by the dotted line) shown by the symbol C in FIG. 10. As the reproducing mode scanning locus C of the "−" azimuth head 5 passes through the "+" azimuth recording area of the four times speed reproduction data area, it becomes the opposite azimuth and cannot be reproduced. In a case where there are two adjacent tracks, one of which is the "+" if azimuth recording area and the other is the "−" azimuth recording area, four times speed reproducing data are almost simultaneously reproduced as shown by the symbols A and B using two azimuth heads 12, 13 (FIG. 5) to obtain all data required for the four times speed reproduction. However, if two mono-azimuth heads are oppositely arranged on a rotary drum like those shown in FIG. 21, it is only possible to reproduce data in one recording area (the left track recording area) using the "+" azimuth head 4 as shown by the symbol A (no reproduction is shown for the symbols B and C).

Thus, in the digital picture image signal recording or reproducing method in another embodiment of the present invention, when recording data for the particular speed reproduction by a VTR equipped with singular location double azimuth heads, picture image data are recorded in the left track (the left side recording area of the four times speed data area 53 shown in FIG. 10) of two tracks separately from the right track recording area to allow particular speed reproduction by a VTR equipped with two oppositely arranged mono-azimuth heads. Data are also constructed so that four times speed picture images can be revived only by data reproduced by the "+" azimuth head 4 of the oppositely arranged mono-azimuth heads in the reproduction at a four times speed. If data in the left track recording area are not separated from the data in the right track recording area, picture image data encoded in variable length after the DCT process are consecutively recorded with the correlation extending over four recording areas for the four times speed reproduction of the two adjacent left and right tracks. As a consequence, picture images cannot be revived through reproduction by only one of the azimuth heads (for instance, the "+" azimuth head) of the oppositely arranged mono-azimuth heads.

Therefore, in the case of a digital VTR which records or reproduces digital picture image signals compressed by high efficiency encoding on or from a tape through the rotary heads, particular speed reproduction data are constructed by low frequency component data of intra-frame or inter-frame compression picture images after the DCT processing and are recorded on a tape by decoding particular speed reproduction data in variable length separately for each azimuth channel so that they can be reproduced by either the double azimuth heads or the oppositely arranged mono-azimuth heads when arranging the particular speed reproduction data on a tape.

Furthermore, when recording, the picture image data are split into two parts for each azimuth channel and the recording azimuth of the halved picture image data is changed for every picture image updating period.

Figure 11:
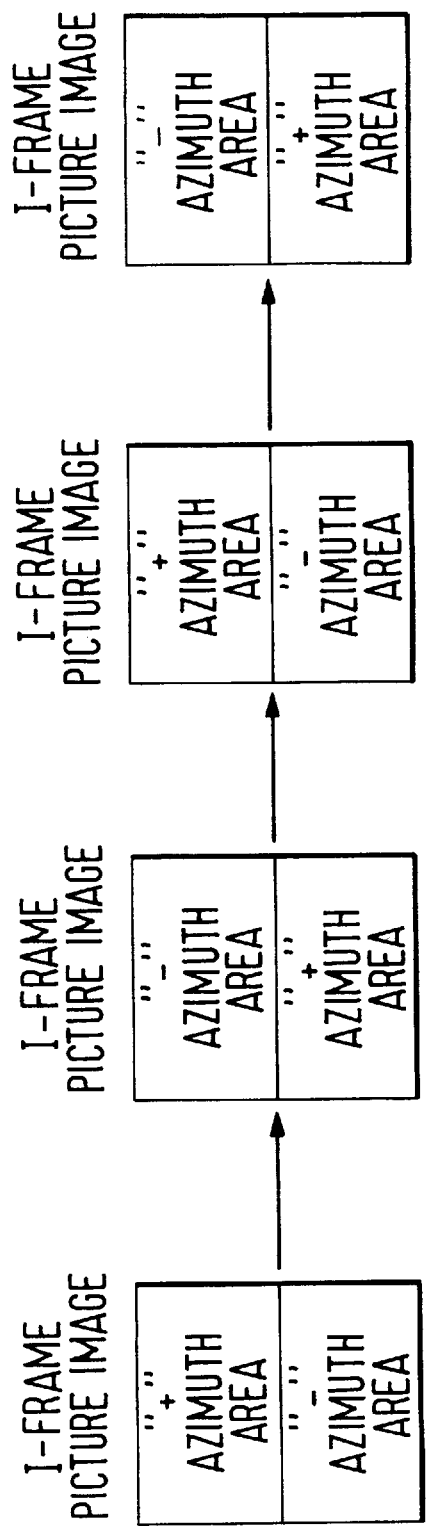
FIG. 11 is a diagram for explaining one example of the data recording method that is used for performing the recording or reproducing method shown in FIG. 10.

That is, when I-frame picture image (intra-frame compressed picture image) data existing at every 12 frames are DCT processed, particular speed reproduction data are constructed with the low frequency component data. After encoding the data in variable length, they are arranged as shown in FIG. 11, in the first frame updating period. The upper half data of the I-frame picture image are recorded in the "+" azimuth area of the track pattern by the "+" azimuth head and the lower half data of the I-frame picture image are recorded in the "+" azimuth area of the track pattern by the "+" azimuth head. When data are recorded in this manner, it becomes possible to perform the encoding of particular speed reproduction data in variable length separately for each azimuth channel and, at the same time, it becomes possible to change the recording azimuths of the halved upper and lower picture image data for every frame updating period and to perform the reproduction through the oppositely arranged mono-azimuth heads as well as the double azimuth heads.

For instance, in the reproduction at a four times speed, low frequency components of I-frame picture image data are extracted and the amount of data is limited to an amount that can be contained in the particular speed reproduction data area. The data is then recorded in the four times speed area. Here, particular speed reproduction data of a halved picture image are recorded by changing the azimuth.

Next, the construction of a digital VTR achieving the principle described above will be explained.

Figure 12:
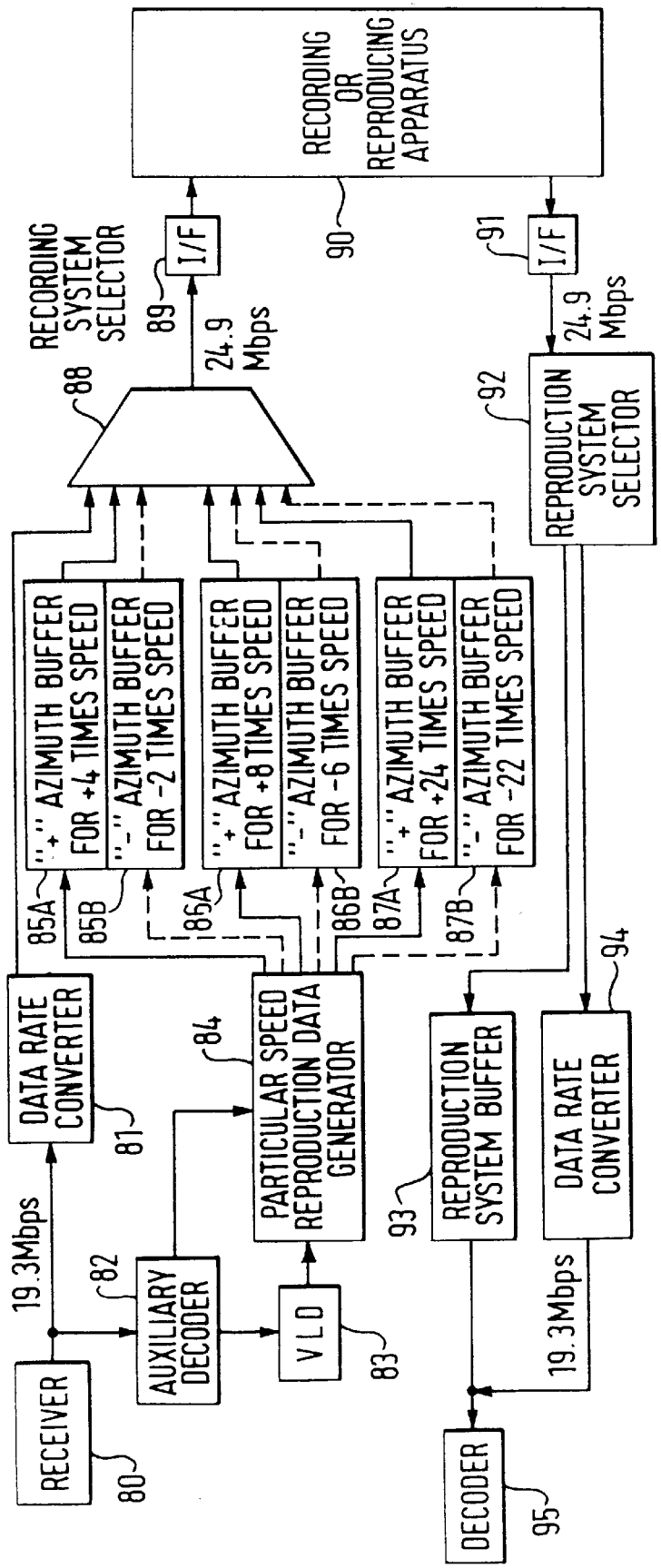
FIG. 12 is a block diagram showing the construction of the digital VTR involved in another embodiment of the present invention.

FIG. 12 is a block diagram showing the construction of a digital VTR in another embodiment of the present invention.

In FIG. 12, only the MPEG bit stream is transmitted from the receiver 80. The data rate converter 81 converts a data rate (for instance, 19.3 Mbps) of the MPEG bit stream into a data rate compatible with the recording or reproducing apparatus (for instance, 24.9 Mbps) (not shown). The data with this converted data rate is output synchronously with the data output from the +4(−2) times speed buffer 85A for the "+" azimuth, the +4(−2) times speed buffer 85B for the "−" azimuth, the +8(−6) times speed buffer 86A for the "+" azimuth, the +8(−6) times speed buffer 86B for the azimuth, the +24(−22) times speed buffer 87A for the "+" azimuth and the +24(−22) times speed buffer 87B for the "−" azimuth. That is, the data with the data rate converted to the tape format of the recording or reproducing apparatus are output from the data rate converter 81. In the data with this converted data rate, an empty area sufficient to accommodate the data from the buffers 85A through 87B, which are described later, is formed. The auxiliary decoder 82 takes the I-frame picture image only out of the MPEG bit stream and outputs the picture image data taken out of the I-frame after coding or decoding it in variable length in the variable length decoder (VLD) 83. The particular speed reproduction data generator 84 splits the picture image data to be recorded for every azimuth channel so that they can be reproduced by both the double azimuth heads and the oppositely arranged mono-azimuth heads. From the DC components and the low frequency component of the AC coefficient of the split picture image data, the data generator 84 takes out three coefficients for the "+" azimuth and the "−" azimuth, and after obtaining various header information required for reproduction of the MPEG data from the auxiliary decoder 82, outputs the coefficients to the +4(−2) times speed buffers 85A and 85B for the "+" azimuth and the "−" azimuth. Further, from the DC component and low frequency component of the AC coefficient of the picture image data, the data generator 84 takes out two coefficients for the "+" azimuth and the "−" azimuth and outputs them to the +8(−6) times speed buffers 86A and 86B for the "+" azimuth and the "−" azimuth. Furthermore, the data generator 84 takes out only the DC component of the picture image data for the a "+" and "−" azimuths and outputs it to the +24(−22) times speed buffers 87A and 87B. The buffers 85A through 87B store data from the particular speed reproduction data generator 84, which are read out sequentially by the recording system selector 88 according to the tape format of the recording or reproducing apparatus 90.

The recording system selector 88 selects and outputs the data output from the data rate converter 81 and the data output from the buffers 85A through 87B to the interface (I/F) 89 to form the data stream according to the tape format of the recording or reproducing apparatus 90. In the interface 89, the data output from the recording system selector 88 is added with an error correction parity, sync signal and ID signal and the added data is output to the recording or reproducing apparatus 90. The recording or reproducing apparatus 90 records received data and pilot signals through the rotary head equipped with the singular location double azimuth heads (see FIG. 5) at 10 tracks per ¹/₃₀ sec. and reproduces the recorded data based on the pilot signals while carrying out the tracking. The interface 91 outputs the data reproduced by the recording or reproducing apparatus 90 after correcting any errors. The reproduction system selector 92 changes a destination of data to be output by an external control signal indicating whether the reproduction is a particular speed reproduction. During standard speed reproduction, data are output to the data rate converter 94 and during particular speed reproduction, data are output to the reproduction system buffer 93. In the data rate converter 94, the data rate of the ordinary reproduced data from the recording or reproducing apparatus 90 is converted to a data rate required by the decoder 95 (for instance, 19.3 Mbps) and the data are output. In the reproduction system buffer 93, the particular speed reproduction data output from the reproduction system selector 92 are stored for one frame to produce a proper picture image. As soon as the particular speed reproduction data for one frame are stored, data are read out in the order of storage for reproduction in the normal direction and data are read out in the reverse order of storage for reproduction in the reverse direction. The data is then output to the decoder 95. The decoder 95 outputs analog picture image signals and voice data signals after decoding, and D/A conversion of the MPEG bit stream.

Further, in the digital picture image signal recording or reproducing method explained in FIG. 10, when arranging the particular speed reproduction data on a tape for tracing by the heads in the particular speed reproduction, it is possible to divide the picture image into two parts and further divide each of the halved parts into N parts so that the data can be reproduced by both the double azimuth heads and the oppositely arranged mono-azimuth heads. In this arrangement, it is possible to update the picture image for every N divided part and exchange the recording azimuth for 1/N data when updating the 1/N picture image.

Figure 13:
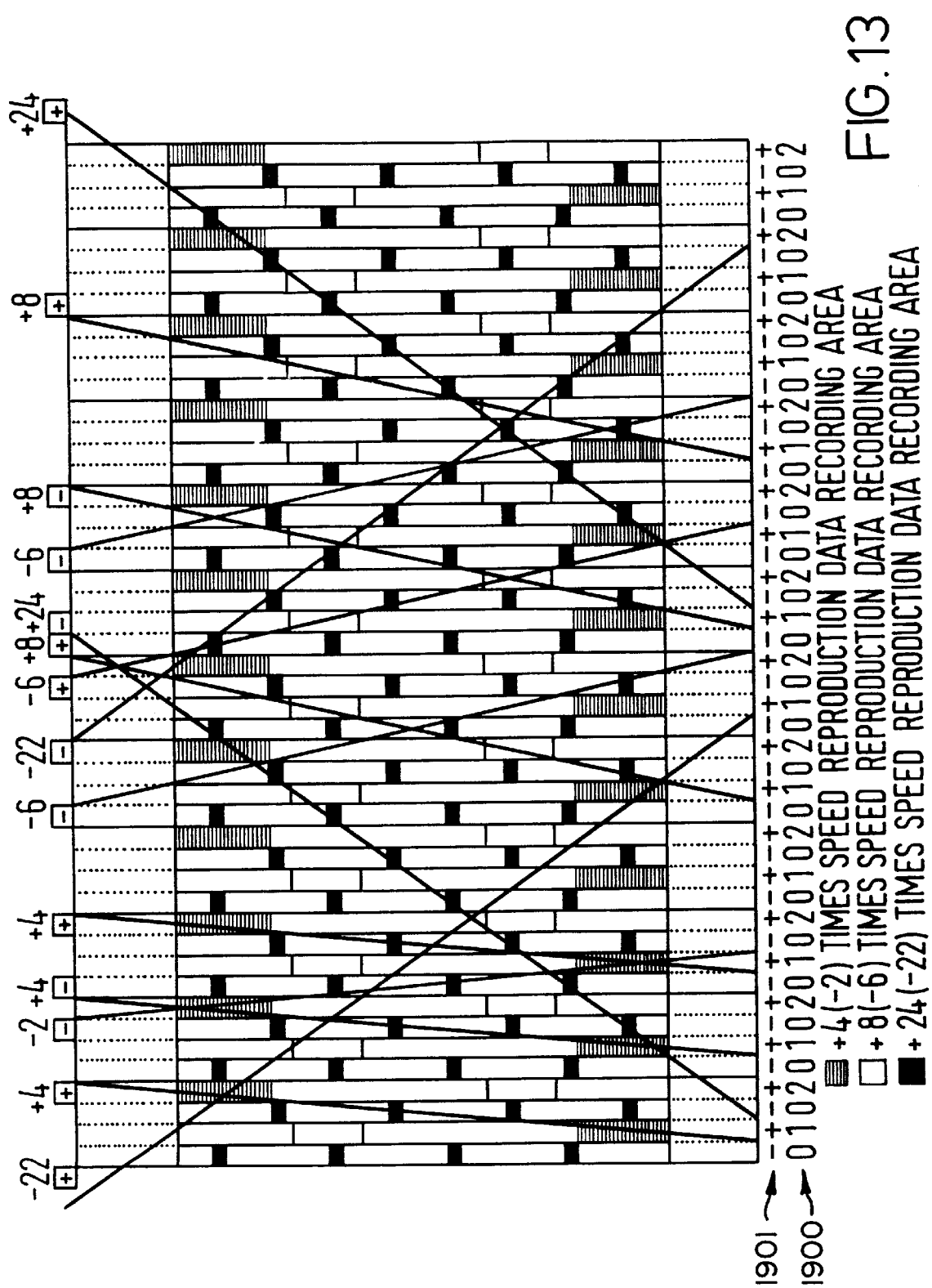
FIG. 13 is a diagram showing the tape format for explaining the digital picture image signal recording or reproducing method in another embodiment of the present invention.
Figure 14:
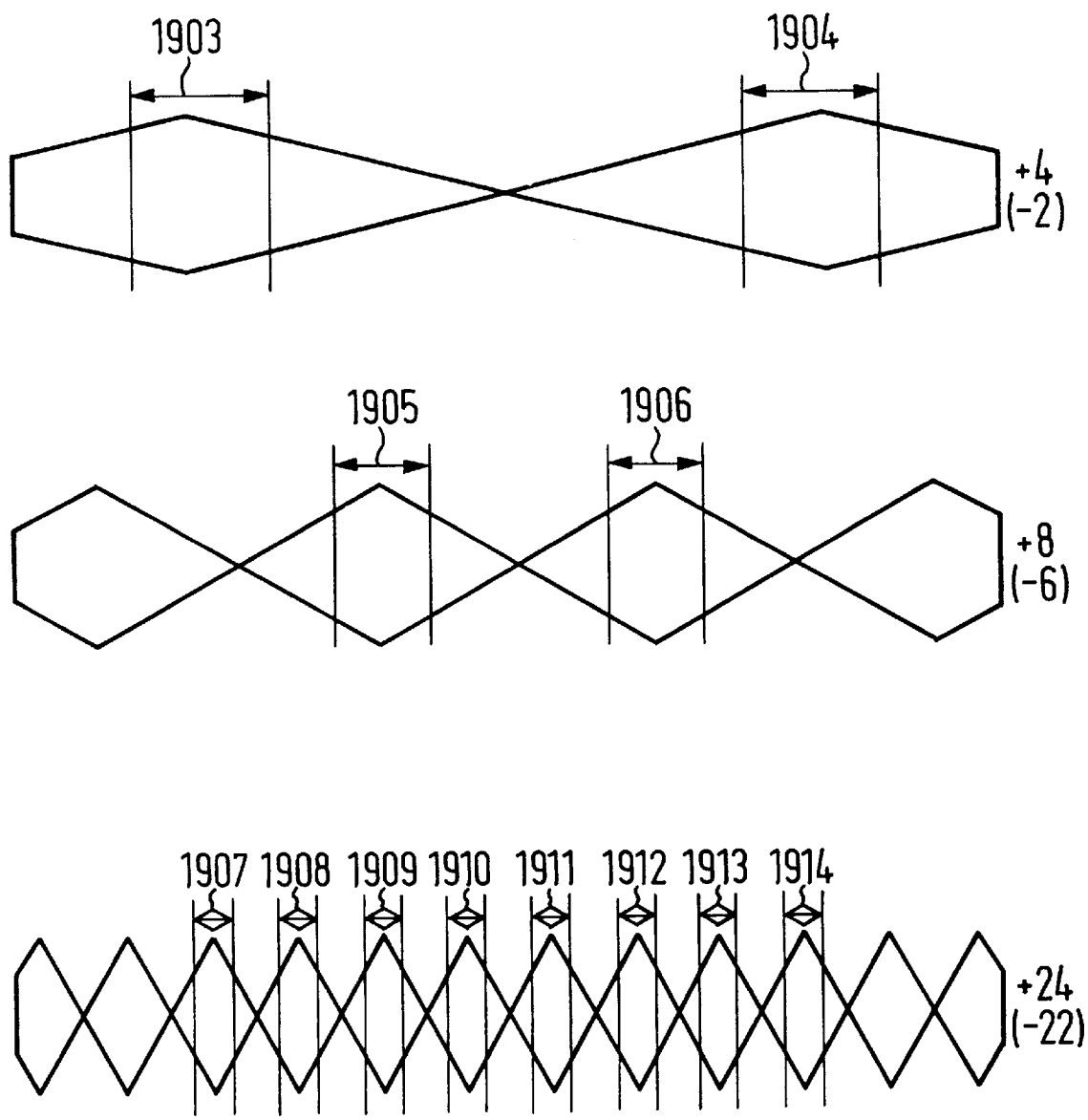
FIG. 14 is a diagram showing the reproduction signal envelopes of the reproducing heads at +4(−2), +8(−6) and +24(−22) times speed shown in FIG. 13.
Figure 15:
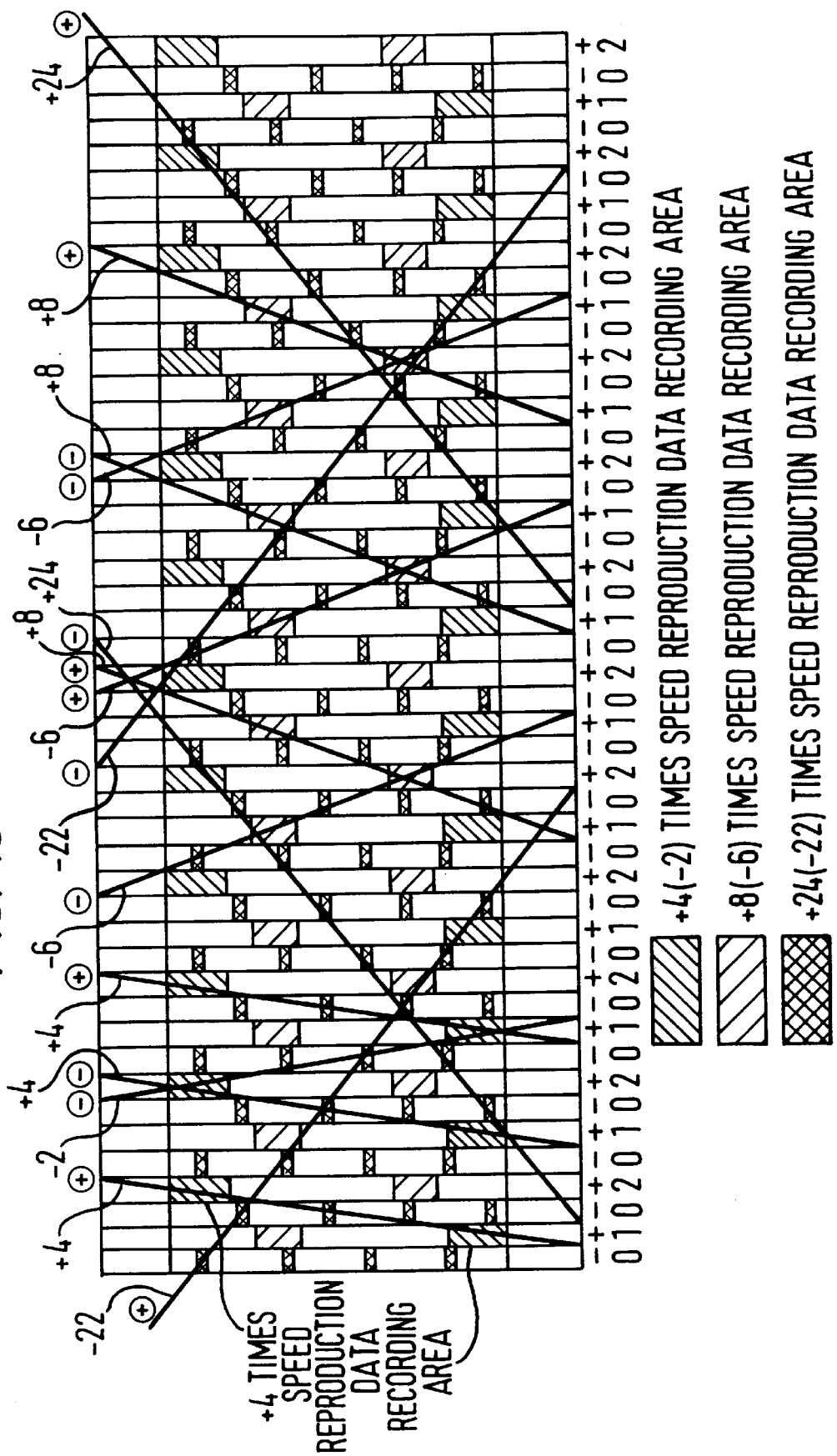
FIG. 15 is a diagram showing the scanning loci of the oppositely arranged mono-azimuth heads on a tape format when reproducing data at +4(−2), +8(−6) and +24(−22) times speeds.

FIGS. 13 through 15 show the tape format for explaining the digital picture image signal recording or reproducing method in another embodiment of the present invention. FIG. 13 shows the scanning loci of the singular location double azimuth heads when reproducing data at the +4(−2), +8(−6) and +24(−22) times speeds on the tape format with the particular speed reproduction data recording areas for respective times speeds added. The scanning loci of the reproducing heads at the respective speeds show the scanning loci at the center of two of the "+" and "−" azimuth heads 12, 13 comprising the singular location double azimuth heads shown in FIG. 5. Reference numeral 1900 shows pilot signals and reference numeral 1901 shows azimuths of the recording tracks. Further, reference numeral 1902 shows azimuths of the reproducing heads in the particular speed reproduction by the symbols "+" and "−".

FIG. 14 shows reproduction signal envelopes of the reproducing heads at the +4(−2), +8(−6) and +24(−22) times speeds. The reproduction signal envelopes here are those obtained by the head having a 10 $\mu$m width, the same width as the 10 $\mu$m width track. In FIG. 14, the +4(−2) times speed data recording area is provided in areas 1903 and 1904, the +8(−6) times speed recording area in areas 1903 and 1904, and the +24(−22) times speed recording area in areas 1907 through 1914, respectively. Here, the number of tracks is equivalent to the pilot signal repetitive period, that is, 4 tracks are considered one group.

From FIG. 13, since the particular speed reproduction data area in the tape format is a four track period, and the speed units of the particular speed reproduction are in multiples of four (e.g., +4, +8, +24) in the normal direction and multiples of four minus 2 (e.g., −2, −6, −22) in the reverse direction, there always exists a tracking point at one point in the four tracks which is the pilot signal period.

The tracking method at this time will be explained. In the reproduction at the +4(−2) times speed, it becomes possible to do the tracking by detecting a pilot signal with the "+" azimuth head 12 comprising the singular location double azimuth heads shown in FIG. 5 on the prescribed line dividing a tape in the cross direction and by controlling the signal at that time to bring the potential difference F1–F2 shown in FIG. 7 downward at the right side and to 0 V. In the reproduction at the +8(−6) times speed, control of the potential difference F1–F2 is conducted upward at the right side and to 0 V in the same operation as described above. Similarly, in the reproduction at the +24(−22) times speed, control of the potential difference F1–F2 is conducted downward at the right side and to 0 V in the center of the particular speed reproduction data areas 1907, 1909, 1911, and 1913 or upward at the right side and to 0 V at the center of the particular speed reproduction data areas 1908, 1910, 1912 and 1914.

FIG. 15 shows the scanning loci of the oppositely arranged mono-azimuth heads on the tape format with the +4(−2), +8(−6) and +24(−22) times speed data recording areas added for performing the reproduction at the respective reproducing speeds. The scanning loci of the reproducing heads at the respective speeds show the scanning loci of the centers of two of the "+" and "−" azimuth heads 4 and 5 comprising the oppositely arranged mono-azimuth heads shown in FIG. 21.

It is possible to reproduce data according to the tracking technique similar to the reproduction technique through the double azimuth heads.

Further, particular speed reproduction data are recorded repetitively for the same reason as in the first embodiment shown in FIG. 1.

Figure 16:
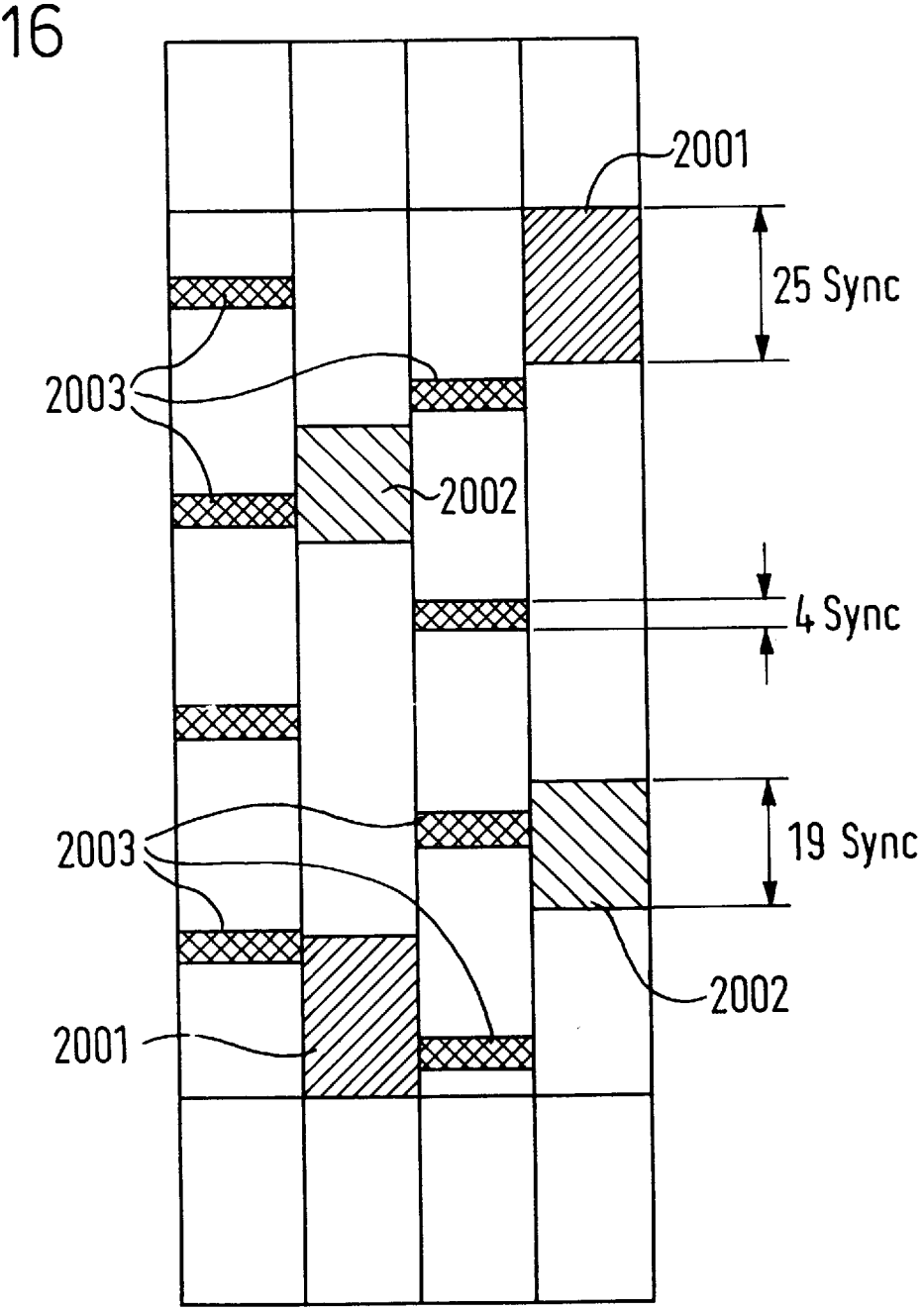
FIG. 16 is a diagram showing the detailed tape format shown in FIGS. 13 and 15.
Figure 17:
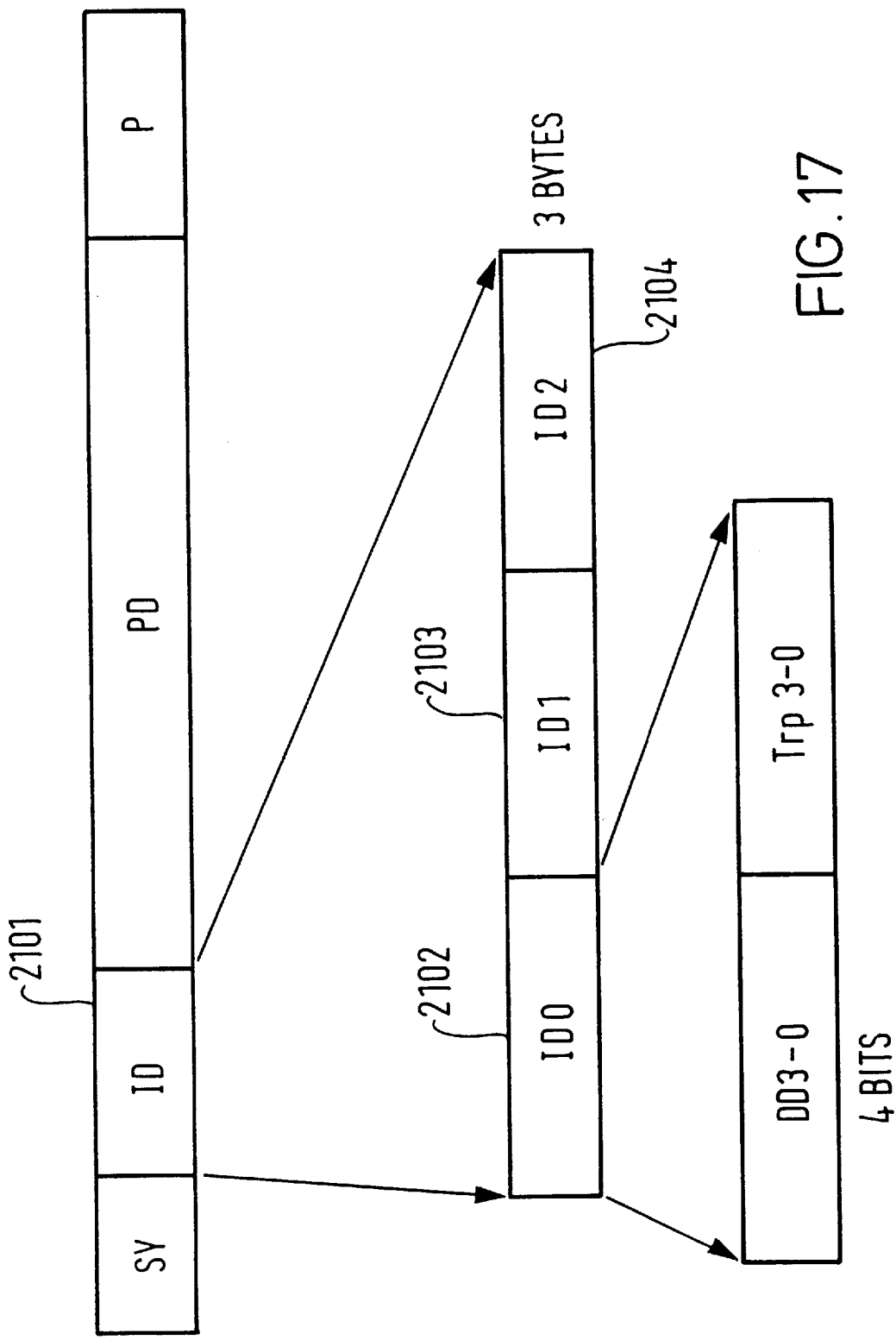
FIG. 17 is a diagram showing the construction of ID in one Sync.

FIG. 16 illustrates the detailed tape formats referred to in FIGS. 13 and 15.

In FIG. 16, reference numeral 2001 is the +4(−2) times speed reproduction data recording area and is comprised of two areas provided at the positions symmetrical to the center of the prescribed split line dividing the tape in the lengthwise direction. Reference numeral 2002 is the +8(−6) times speed reproduction data recording area and is comprised of two areas provided at the positions symmetrical to the center of the prescribed split line dividing the tape in the lengthwise direction. Reference numeral 2003 is the +24(−22) times speed reproduction data recording area and is comprised of eight areas provided at positions symmetrical to the center of the prescribed split line dividing the tape in the lengthwise direction. Each track is provided with a picture image data area and a voice data area. The picture image data area is divided into 135 Syncs. Thus, there are 25 Syncs per reproduction area for the +4(−2) times speed, 19 Syncs per particular speed reproduction area for the +8(−6) times speed and 4 Syncs per reproduction area for the +24(−22) times speed.

The Sync has a construction the same as that as shown in FIG. 3 in the first embodiment. Here, the construction of ID will be explained with reference to FIGS. 17 and 27. ID 2101 is comprised of 3 bytes, i.e., ID0 2102, ID1 2103 and ID2 2104. The ID0 2102 is for recording an identification signal. The ID1 2103 is for recording a Sync block. The ID2 2104 is assigned for recording check codes in cyclic codes for error detections to the ID0–ID2. Here, 4 LSB bits Trp0–Trp3 of the ID0 2102 are used as a signal indicating a group of tracks. The fifth and sixth bits DD0 and DD1 are signals representing speed units of the particular speed reproduction modes for sync block data, as shown in a table (TABLE 2) of FIG. 27. The seventh bit DD2 alternates between the "0" state and "1" state to define a cycle period of the recording data. The eighth bit DD3 takes "0" state when the sync block data is valid for the reproduction, while it takes "1" state when the sync block data is invalid for the reproduction.

Here, the operation of the interface 89 shown in FIG. 8 when the IDs are used will be explained. In the interface 89, the contents of the data input are identified by a signal from a system administrator (not shown) and the DD1 is inserted according to the rule shown in TABLE 2 of FIG. 27 corresponding to the speed units of the particular speed reproductions to which the data belong. Further, the "0" state and "1" state of the DD2 are alternately inserted according to the rules corresponding to units of repetition. In the case where a part of or the entirety of the particular speed reproduction data generator 84 and/or the buffers 85A through 87B do not function or do not exist, the "1" state of the DD3 is inserted into a data area in which data not generated therefore are to be recorded.

Figure 18:
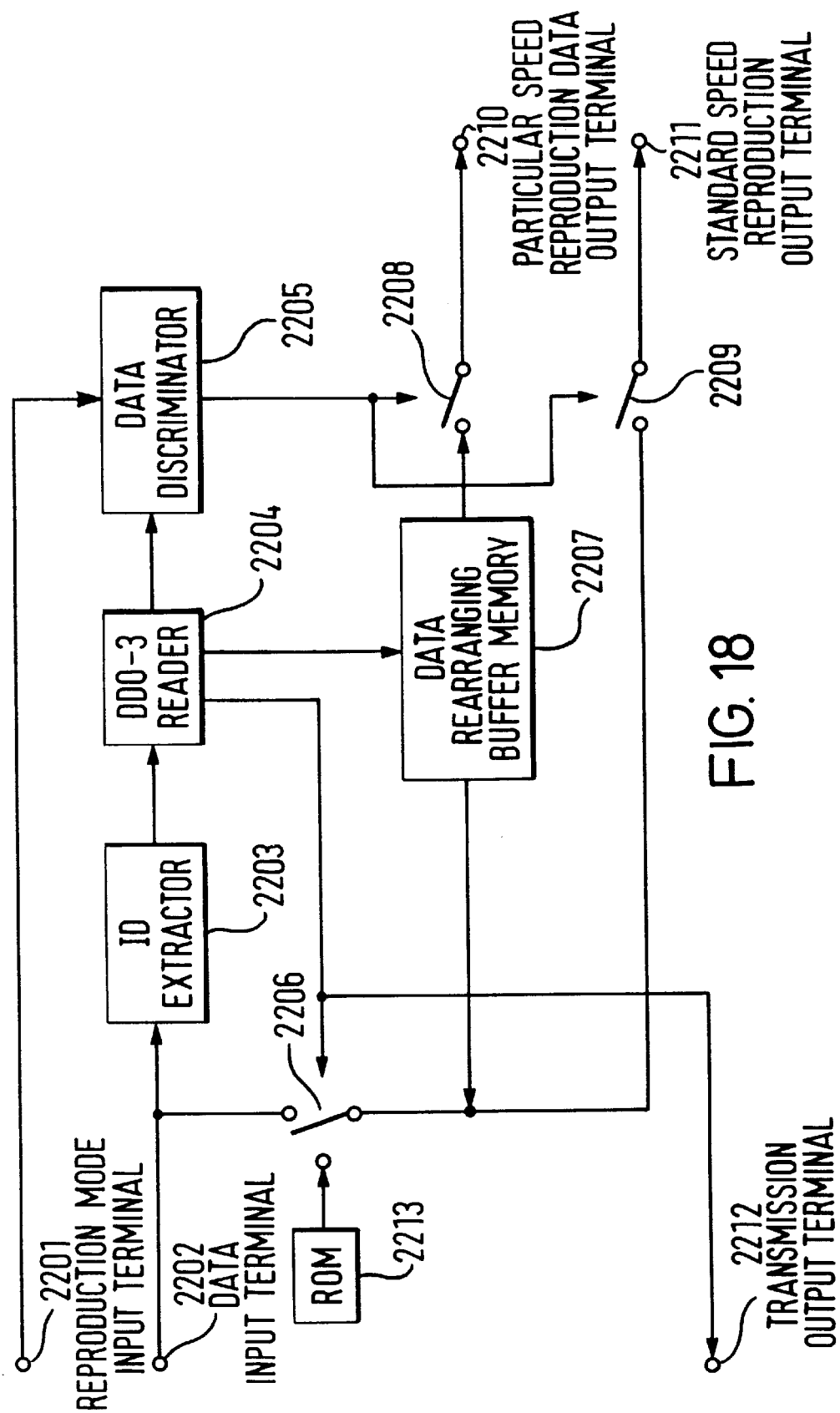
FIG. 18 is a diagram showing the construction of the reproduction system selector shown in FIG. 8.

The operation of the reproduction system selector 92 shown in FIG. 8 when the IDs are used similarly will be explained in reference to FIG. 18. Reproduced data input through a data input terminal 2202 is extracted through its sync block ID by an ID extractor 2203. The extracted sync block ID is then checked with respect to its contents by a DD0–3 reader 2204, which detects the contents of the DD0 through DD3. The contents of the sync block data currently reproduced are checked according to the rules as shown in TABLE 2 (see FIG. 27). The DD0–3 reader 2204 identifies the DD3, and if the data are judged to be invalid, outputs the output from a ROM 2213 via a switch 2206. The ROM 2213 stores video compression signals to display the fact that reproduced data are invalid, as a reproduced picture image on a display unit. Further, the data stating that the reproduced data are invalid is displayed from a system transmission output terminal 2212 via a system administrator (not shown). If the data are judged to be valid, the data from the data input terminal 2202 are applied to a data rearranging buffer memory 2207 via a switch 2206 and directly to a switch 2209. In the data rearranging buffer memory 2207, when the rearrangement of data is required, the data are rearranged according to DD2 that is identified by the DD0–3 reader 2204. The details of the data rearranging operation will be described later. The output of the data rearranging buffer memory 2207 is sent to a switch 2208. The current reproduction mode is sent into one of the inputs of a data discriminator 2205 from the system administrator (not shown) via the reproduction mode input terminal 2201. Further, a reproducing speed identified by the DD0–3 reader 2204 and at which data are being reproduced is sent into the other input of the data discriminator 2205. In the data discriminator 2205, the switches 2208 are short circuited when two inputs agree with each other, and both outputs are sent to a particular speed reproduction data output terminal 2210 and a standard speed reproduction output terminal 2211.

Figure 19:
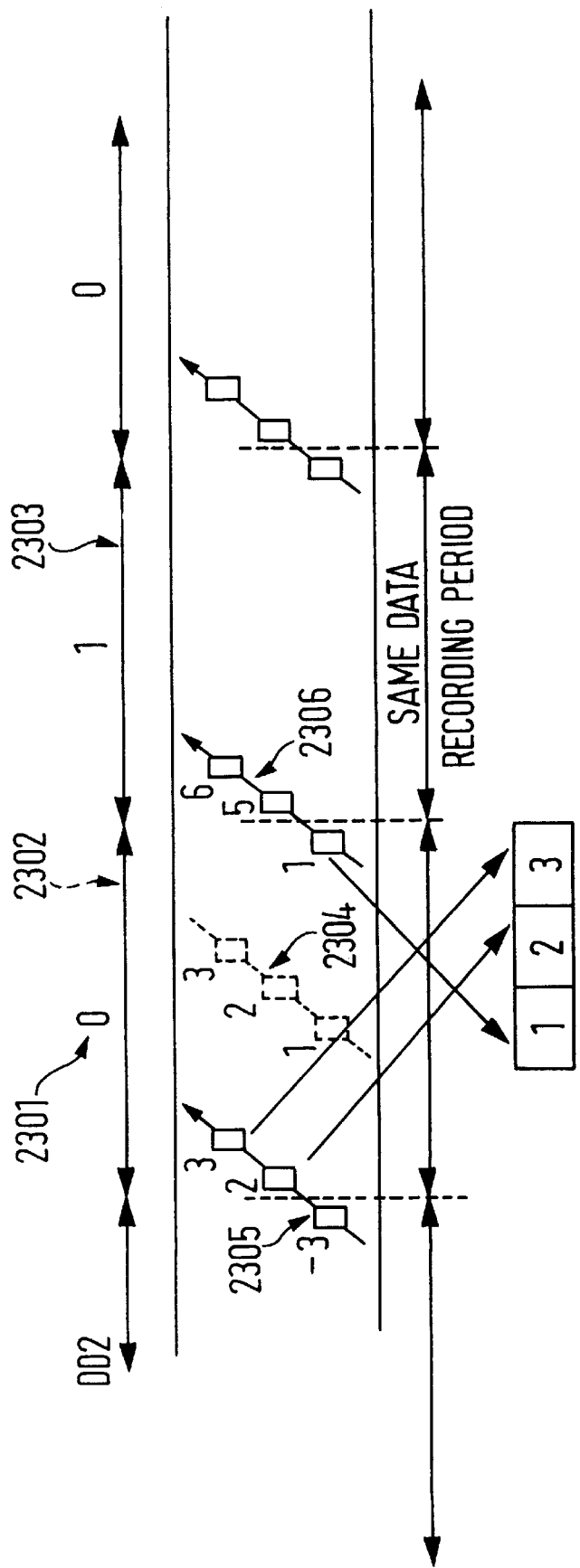
FIG. 19 is a diagram for explaining the data rearranging operation.
Figure 20:
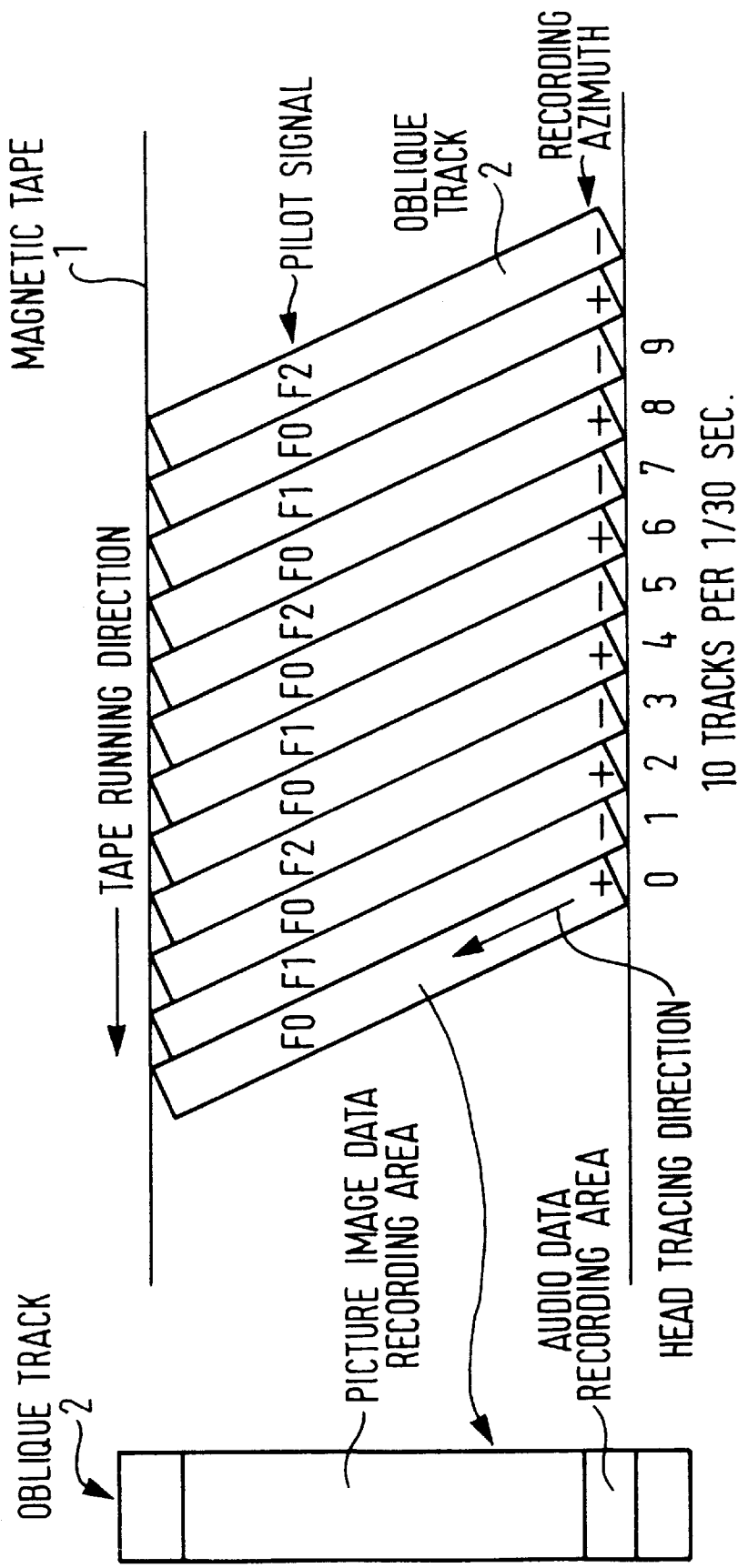
FIG. 20 is a diagram showing the tape format for a conventional digital VTR for consumer use.

Here, the data rearranging operation described above will be explained by using the reproduction at a 24 times speed of the format shown in the first embodiment as an example, referring to FIG. 19. Reference numeral 2301 shows the contents of the DD2, and the same repetitive data are recorded in the particular speed reproduction areas for the period shown by the arrows 2302 and 2303. Here, the data stream to be used is arranged in the order of areas 1, 2 and 3 as shown by reference numeral 2304. However, in the actual reproducing operation, the head tracing may be as shown by reference numerals 2305 and 2306 in some cases. In this case, when data are rearranged in the order of tracing, the areas are in a 2, 3 and 1 order. Here, it is clear that all data in a single unit of repetition can be picked up by two traces. As shown in FIG. 19, the same DD2 rearranges data showing 0 collectively and when three areas are rearranged, data are sequentially read out. At this time, data having the contents of the same DD2 can be rearranged in the order based on the sync block ID of ID1.

In the embodiments described above, the GOP was constructed in units of frames, but it is possible to construct the GOP in units of fields instead of frames according to the MPEG standard, and in this case the I-frame, P-frame and B-frame will become the I-field, P-field and B-field, respectively.

Further, the present invention is not limited to the embodiments described above. For instance, the construction of GOP, the number of tracks per 1/30 sec., the contents of data for the particular speed reproduction, the frame period to be updated in the particular speed reproduction, the repetitive period of pilot signals and the speed of the particular speed reproduction that is decided in connection with them can be set to other values. The present invention can also be applied to a digital VTR equipped with rotary heads configured such that a pair of the double azimuth heads all oppositely arranged on a rotary drum.

As described above, the present invention determines special reproducing speeds and a period of the particular speed reproduction recording area according to a pilot signal repetitive period for the tracking. Furthermore, low speed and high speed reproduction data recording areas are arranged symmetrically on a tape, data are repetitively recorded for each reproducing speed, and tracking can be conducted by using pilot signals in the particular speed reproduction. Thus, finer pictures, wider range updated pictures, or reproduced pictures having improved picture quality at low speeds are obtained by utilizing the difference in capacity of recording areas for respective reproducing speeds. Therefore, stabilized and easily viewable particular speed reproduction data at all reproducing speeds becomes possible.

As described above, the present invention can provide a preferable method and apparatus for recording or reproducing digital picture image signals.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A digital picture image signal recording method, wherein tracks are formed sequentially on a tape recording medium running at a prescribed speed, said tracks being arranged oblique to the running direction of the tape recording medium, digital picture image signals compressed by a high efficiency encoding technique are recorded using rotary heads at the same time the tracks are formed, and plural kinds of pilot signals having different frequencies on adjacent tracks are recorded, the method comprising the steps of:

deriving data which are essential to decoding the recorded digital picture image signals from the high efficiency encoded signals, wherein the essential data for decoding the recorded digital picture image are derived for multiple reproducing speeds;

successively establishing recording areas in units of a number of tracks equivalent to a cycle period of the pilot signals that can be distinguished through the pilot signals as one repetitive cycle, wherein the recording areas associated with each reproducing speed are arranged such that the essential data for each reproducing speed would be arranged symmetrically with respect to the longitudinal center line of the recording medium if the oblique direction of the tracks were mapped perpendicularly to the longitudinal center line of the medium; and recording the essential data associated with each reproducing speed in the recording areas.

2. A digital picture image signal recording method, wherein tracks are formed sequentially on a tape recording medium running at a prescribed speed, said tracks being arranged oblique to the running direction of the tape recording medium, digital picture image signals compressed by a high efficiency encoding technique are recorded using rotary heads at the same time the tracks are formed, and plural kinds of pilot signals with different frequencies on adjacent tracks are recorded, the method comprising the steps of:

deriving data which are essential for decoding the recorded digital picture image signals at multiple speeds from the high efficiency encoded digital signals, wherein the essential data for decoding the recorded digital picture image are derived for multiple reproducing speeds;

successively establishing recording areas associated with each reproducing speed in units of the maximum number of contiguous tracks that can be distinguished through the pilot signals as one repetitive cycle, wherein the recording areas associated with each reproducing speed are arranged such that the essential data for each reproducing speed would be arranged symmetrically with respect to the longitudinal center line of the recording medium if the oblique direction of the tracks were mapped perpendicularly to the longitudinal center line of the medium; and recording the essential data associated with each reproducing speed in the recording areas.

3. A digital picture image signal recording or reproducing method, wherein tracks are formed sequentially on a tape recording medium running at a prescribed speed, said tracks being arranged oblique to the running direction of the tape recording medium, digital picture image signals compressed by a high efficiency encoding technique are recorded using the rotary heads at the same time the tracks are formed, and plural kinds of pilot signals with different frequencies are recorded on adjacent tracks, said method comprising the steps of:

successively establishing recording areas in units of tracks equivalent to a cycle period of the pilot signals that can be distinguished through the pilot signals as one repetitive cycle;

discriminating between said tracks, while in recording mode, by determining changes in a differential voltage associated with the pilot signals in each cycle period;

reproducing the digital picture image signals recorded on the tape recording medium by the rotary heads while running the recording medium at a reproducing speed equal to a multiple or submultiples of the number of tracks equivalent to each cycle period;

deriving essential data for decoding the recording digital picture image signals at every reproducing speed from the high efficiency encoded digital signals; and recording the essential data in different recording areas of the track at every reproducing speed and arranging the recording areas associated with each reproducing speed such that the essential data for each reproducing speed would be arranged symmetrically with respect to the longitudinal center line of the recording medium if the oblique direction of the tracks were mapped perpendicularly to the longitudinal center line of the recording medium.

4. A digital picture image signal recording or reproducing method, wherein tracks are formed sequentially on a tape recording medium running at a prescribed speed, said tracks being arranged oblique to the running direction of the tape recording medium, digital picture image signals compressed by a high efficiency encoding technique are recorded using the rotary heads at the same time the tracks are formed, and plural kinds of pilot signals with different frequencies are recorded on adjacent tracks, said method comprising the steps of:

successively establishing recording areas in units of the maximum number of contiguous tracks that can be distinguished through the pilot signals as one cycle period;

discriminating between said tracks, while in recording mode, by determining changes in a differential voltage associated with the pilot signals in each cycle period;

reproducing the digital picture image signals recorded on the tape recording medium by the rotary heads while running the recording medium at a reproducing speed equal to a multiple or submultiples of the number of tracks equivalent to each cycle period;

deriving essential data for decoding the recording digital picture image signals at every reproducing speed from the high efficiency encoded digital signals; and recording the essential data in different recording areas of the track at every reproducing speed and arranging the recording areas associated with each reproducing speed such that the essential data for each reproducing speed would be arranged symmetrically with respect to the longitudinal center line of the recording medium if the oblique direction of the tracks were mapped perpendicularly to the longitudinal center line of the recording medium.

5. A digital picture image signal recording or reproducing method, wherein tracks are formed sequentially on a tape recording medium running at a prescribed speed, said tracks being arranged oblique to the running direction of the tape recording medium, digital picture image signals compressed by a high efficiency encoding technique are recorded using the rotary heads at the same time the tracks are formed, plural kinds of pilot signals with different frequencies are recorded on adjacent tracks, and recording areas in units of tracks being equivalent to a cycle period of the pilot signals, said method comprising the steps of:

deriving data essential for decoding the recorded digital picture image signals from the high efficiency encoded digital signals;

discriminating between said tracks, while in recording mode, by determining changes in a differential voltage associated with the pilot signals in each cycle period;

reproducing the digital picture image signals recorded on the tape recording medium by the rotary heads while running the recording medium at a reproducing speed equal to a multiple or submultiples of the number of tracks in each unit;

establishing multiple data recording areas, each of which is independently provided for each speed, within the number of tracks in each unit and arranging the recording areas such that the recording areas would be arranged symmetrically about points on the longitudinal axial line of the recording medium for each speed if the oblique direction of the tracks were mapped perpendicularly with respect to the longitudinal center line of the recording medium; and recording data which are essential to the decoding in the recording areas.

6. A digital picture image signal recording or reproducing method, wherein tracks are formed sequentially on a tape recording medium running at a prescribed speed, said tracks being arranged oblique to the running direction of the tape recording medium, digital picture image signals compressed by a high efficiency encoding technique are recorded using the rotary heads at the same time the tracks are formed, plural kinds of pilot signals with different frequencies are recorded on adjacent tracks, and recording areas in units of the maximum number of contiguous tracks that can be distinguished through the pilot signals as one cycle period, said method comprising the steps of:

deriving data essential for decoding the recorded digital picture image signals from the high efficiency encoded digital signals;

discriminating between said tracks, while in recording mode, by determining changes in a differential voltage associated with the pilot signals in each cycle period;

reproducing the digital picture image signals recorded on the tape recording medium by the rotary heads while running the recording medium at a reproducing speed equal to a multiple or submultiples of the number of unit tracks;

establishing multiple data recording areas, each of which is independently provided for each speed, within the number of tracks in each unit and arranging the recording areas in positions such that the recording areas would be arranged symmetrically about points on the longitudinal axial line of the recording medium for each speed if the oblique direction of the tracks were mapped perpendicularly with respect to the longitudinal center line of the recording medium; and recording data which are essential to the decoding in the recording areas.

* * * * *